(12) United States Patent
Dao et al.

(10) Patent No.: US 11,483,680 B2
(45) Date of Patent: Oct. 25, 2022

(54) METHOD AND SYSTEM FOR MULTICAST AND BROADCAST SERVICES

(71) Applicant: HUAWEI TECHNOLOGIES CO., LTD., Shenzhen (CN)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 17/176,727

(22) Filed: Feb. 16, 2021

(65) Prior Publication Data

US 2021/0168568 A1 Jun. 3, 2021

Related U.S. Application Data

(63) Continuation of application No. 16/195,469, filed on Nov. 19, 2018, now Pat. No. 10,932,095.
(Continued)

(51) Int. Cl.
| | |
|---|---|
| *H04W 4/06* | (2009.01) |
| *H04W 76/40* | (2018.01) |
| *H04W 28/04* | (2009.01) |
| *H04L 9/40* | (2022.01) |
| *H04W 12/06* | (2021.01) |
| *H04L 67/147* | (2022.01) |
| *H04L 12/18* | (2006.01) |
| *H04W 12/03* | (2021.01) |
| *H04W 12/04* | (2021.01) |
| *H04W 12/76* | (2021.01) |

(52) U.S. Cl.
CPC ............. *H04W 4/06* (2013.01); *H04L 12/185* (2013.01); *H04L 63/0428* (2013.01); *H04L 63/061* (2013.01); *H04L 63/08* (2013.01); *H04L 67/147* (2013.01); *H04W 12/03* (2021.01); *H04W 12/06* (2013.01); *H04W 28/04* (2013.01); *H04W 76/40* (2018.02); *H04W 12/04* (2013.01); *H04W 12/76* (2021.01)

(58) Field of Classification Search
None
See application file for complete search history.

(56) References Cited

U.S. PATENT DOCUMENTS

| | | | |
|---|---|---|---|
| 2010/0254352 A1 | 10/2010 | Wang et al. | |
| 2015/0230073 A1 | 8/2015 | Pandey et al. | |
| (Continued) | | | |

FOREIGN PATENT DOCUMENTS

| | | |
|---|---|---|
| CN | 1617523 A | 5/2005 |
| CN | 101399684 A | 4/2009 |
| (Continued) | | |

OTHER PUBLICATIONS

"System Architecture for the 5G System; Stage 2"; 3GPP TS 23.501 V1.4.0 (Sep. 2017).
(Continued)

*Primary Examiner* — Ajit Patel

(57) ABSTRACT

A method of MB delivery of Downlink (DL) MB Data to a plurality of Electronic Devices (EDs) connected to a (Radio) Access Network (R)AN node, the method comprises: storing the DL MB Data in a buffer of the (R)AN node; and transmitting, by the (R)AN node, the DL MB Data to the plurality of EDs.

20 Claims, 13 Drawing Sheets

Related U.S. Application Data

(60) Provisional application No. 62/590,210, filed on Nov. 22, 2017.

(56) References Cited

U.S. PATENT DOCUMENTS

| | | | | |
|---|---|---|---|---|
| 2019/0075431 A1* | 3/2019 | Albasheir | ............... | H04L 67/52 |
| 2019/0357081 A1* | 11/2019 | Gottardi | ................. | H04L 45/28 |

FOREIGN PATENT DOCUMENTS

| | | | | |
|---|---|---|---|---|
| CN | 101400017 A | 4/2009 | | |
| CN | 102684856 A | 9/2012 | | |
| EP | 3119160 A2 | 1/2017 | | |
| WO | 2017196161 A1 | 11/2017 | | |
| WO | WO-2018233808 A1 * | 12/2018 | ........ | H04W 28/0215 |
| WO | WO-2019101292 A1 * | 5/2019 | ........... | H04L 67/327 |

OTHER PUBLICATIONS

3GPP TR 26.891 V0.3.1 (Oct. 2017),3rd Generation Partnership Project;Technical Specification Group Services and System Aspects;5G enhanced Mobile Broadband;Media Distribution(Release 15),total 30 pages.

* cited by examiner

METHOD AND SYSTEM FOR MULTICAST AND BROADCAST SERVICES

REFERENCE TO RELATED APPLICATIONS

The present application claims priority from U.S. Provisional Patent Application No. 62/590,210, filed on Nov. 22, 2017 with title MULTICAST AND BROADCAST SERVICES and is a continuation of U.S. patent application Ser. No. 16/195,469, filed on Nov. 19, 2018 which is incorporated herein by reference in its entirety.

FIELD OF THE INVENTION

The present invention generally pertains to the field of Communications Networks, and particular embodiments or aspects relate to multicast and broadcast services.

BACKGROUND

The Multicast and Broadcast Multimedia Subsystem (MBMS) has been developed for 3G and 4G systems. The MBMS was initially designed for video broadcasting and streaming services, and has been extended for other services such as public safety, Vehicle to Vehicle or Infrastructure (V2X) communications, and Internet of Things (IoT) communications. However, many V2X and IoT devices do not support the MBMS function in 4G systems. These devices are typically very simple to reduce the cost and power consumption, but consequently lack sufficient capacity to use the MBMS. Therefore, it is desirable develop alternative solutions for 5G system to support multicast and broadcast transmission for V2X and IoT devices, and any other devices.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method of multicast-broadcast delivery of Downlink (DL) Data to a plurality of Electronic Devices (EDs) connected to a (Radio) Access Network (R)AN node, the method comprises: storing the DL MB Data in a buffer of the (R)AN node; and transmitting, by the (R)AN node, the DL MB Data to the plurality of EDs.

A further aspect of the present invention provides a method of multicast-broadcast delivery of Downlink (DL) Data to a plurality of Electronic Devices (EDs) connected to a (Radio) Access Network (R)AN node, the method comprises: establishing a user plane (UP) data path (including tunnel) between a UP function and a (R)AN node in the core network (CN), the path being independent of data radio bearers (DRBs) between the (R)AN node and EDs within a service area of the (R)AN node.

BRIEF DESCRIPTION OF THE FIGURES

Further features and advantages of the present invention will become apparent from the following detailed description, taken in combination with the appended drawings, in which.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it shall be understood that the present invention is not limited to such networks.

In the following description, example embodiments describe techniques for selective applying cryptographic privacy protection to messages passing between an electronic device (ED) (such as a User Equipment, UE) and a Radio Access Network (RAN) node. These techniques may be used to incorporate both plaintext information and encrypted information within the same protocol data unit (PDU). Current procedures either fully encrypt the messages conveyed between the ED and the RAN or provide no privacy protection at all.

The term "PDU protection layer (PPL)" is used in this disclosure to refer to mechanisms for integrity protection and encryption similar to those provided by PDCP, however other mechanisms may be used where appropriate. In addition, the nomenclature of 3GPP TS 33.401, "3GPP System Architecture Evolution (SAE); Security architecture", and 3GPP TS 33.501, "Security Architecture and Procedures for 5G System", is used to describe cryptographic keys and algorithms. However, an alternative nomenclature may be used where appropriate.

The term "plaintext" should be understood to refer to information (in any form) that is not encrypted.

The term "encryption" should be understood to refer to the application of cryptographic privacy protection techniques (in any suitable form) to one or more blocks of data.

Figure 1:
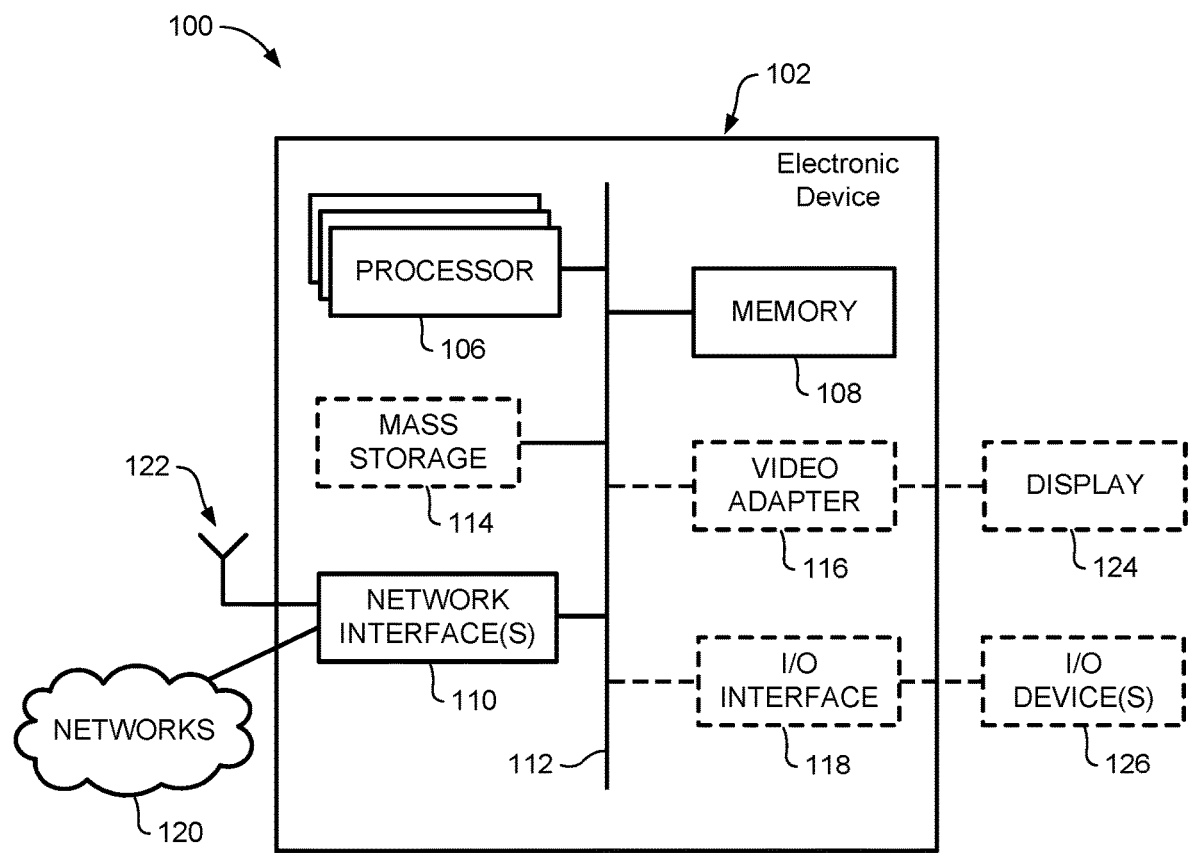
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) communication device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
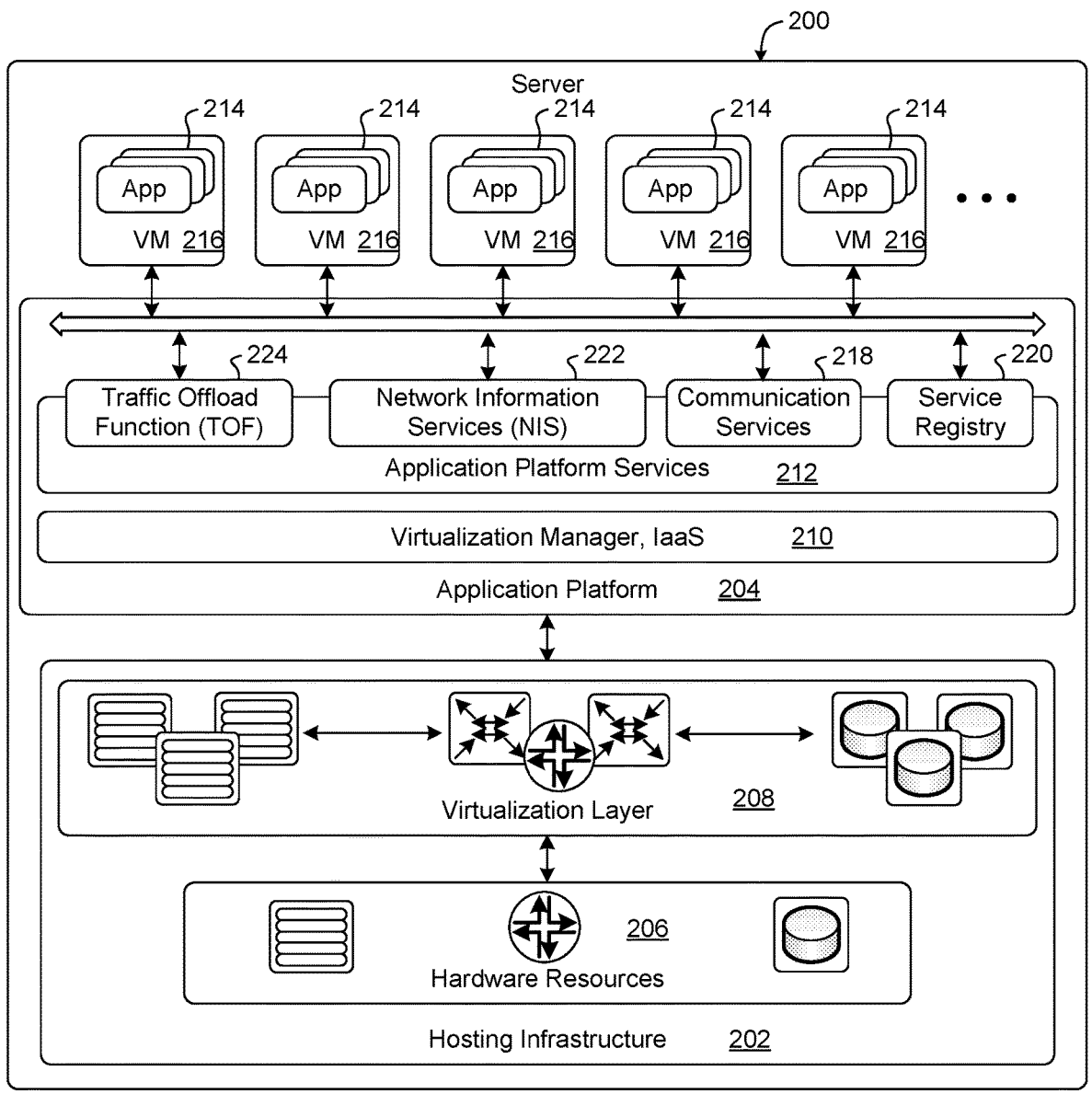
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
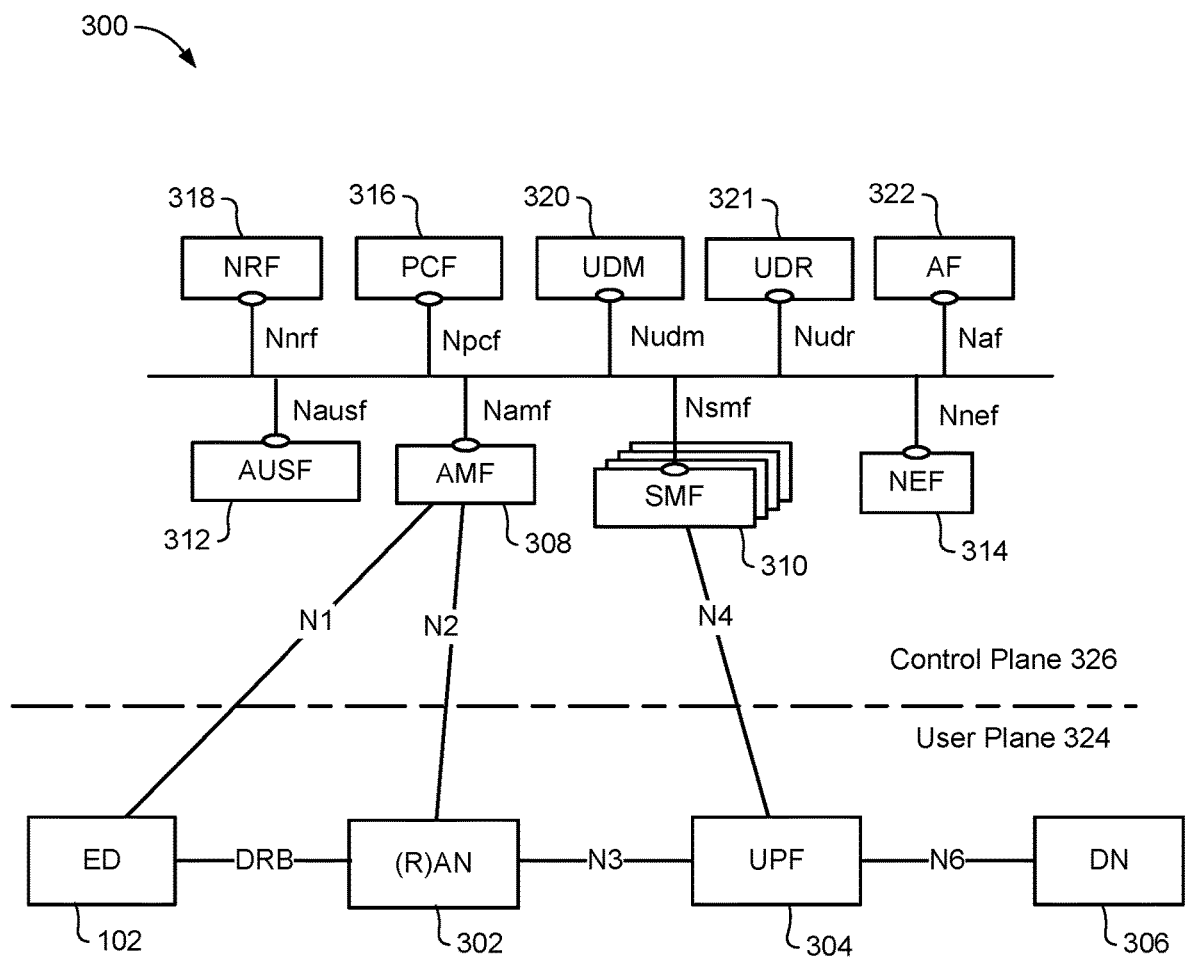
FIG. 3 is a block diagram illustrating a service-based view of a system architecture of a 5G Core Network.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to an ED as well as the selection of a UPF 304 (or a particular instance of a UPF 304) for traffic associated with a particular session of ED 102. It will be appreciated that there will typically be multiple SMFs 310 in the network 300, each of which may be associated with a respective group of EDs 102, (R)AN nodes 302 or UPFs 304. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and EDs connected to the network to determine where and how to access existing network functions, and may present the service based interface Nnrf.

PCF 316 communicates with other network functions over a service based Npcf interface, and can be used to provide policy and rules to other network functions, including those within the control plane. Enforcement and application of the policies and rules is not necessarily the responsibility of the PCF 316, and is instead typically the responsibility of the functions to which the PCF 316 transmits the policy. In one such example the PCF 316 may transmit policy associated with session management to the SMF 310. This may be used to allow for a unified policy framework with which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface, such as Nudr to connect to a User Data Repository (UDR) 321. The PCF 316 may be associated with the UDM 320 because it may be involved with requesting and providing subscription policy information to the UDR, but it should be understood that typically the PCF 316 and the UDM 320 are independent functions.

The PCF 316 may have a direct interface to the UDR 321 or can use Nudr interface to connection with UDR 321. The UDM 320 can receive requests to retrieve content stored in the UDR 321, or requests to store content in the UDR 321. The UDM 320 is typically responsible for functionality such as the processing of credentials, location management and subscription management. The UDR 321 may also support any or all of Authentication Credential Processing, User Identification handling, Access Authorization, Registration/Mobility management, subscription management, and Short Message Service (SMS) management. The UDR 321 is typically responsible for storing data provided by the UDM 320. The stored data is typically associated with policy profile information (which may be provided by PCF 316) that governs the access rights to the stored data. In some embodiments, the UDR 321 may store policy data, as well as user subscription data which may include any or all of subscription identifiers, security credentials, access and mobility related subscription data and session related data.

The Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

The ED 102 communicates with network functions that are in the User Plane (UP) 324, and the Control Plane (CP) 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as Control Plane Functions. AF 322 may communicate with other functions within CN CP 326 (either directly or indirectly through the NEF 314), but is typically not considered to be a part of the CN CP 326.

Those skilled in the art will appreciate that there may be a plurality of UPFs connected in series between the (R)AN node 302 and the DN 306, and multiple data sessions to different DNs can be accommodated through the use of multiple UPFs in parallel.

Figure 4:
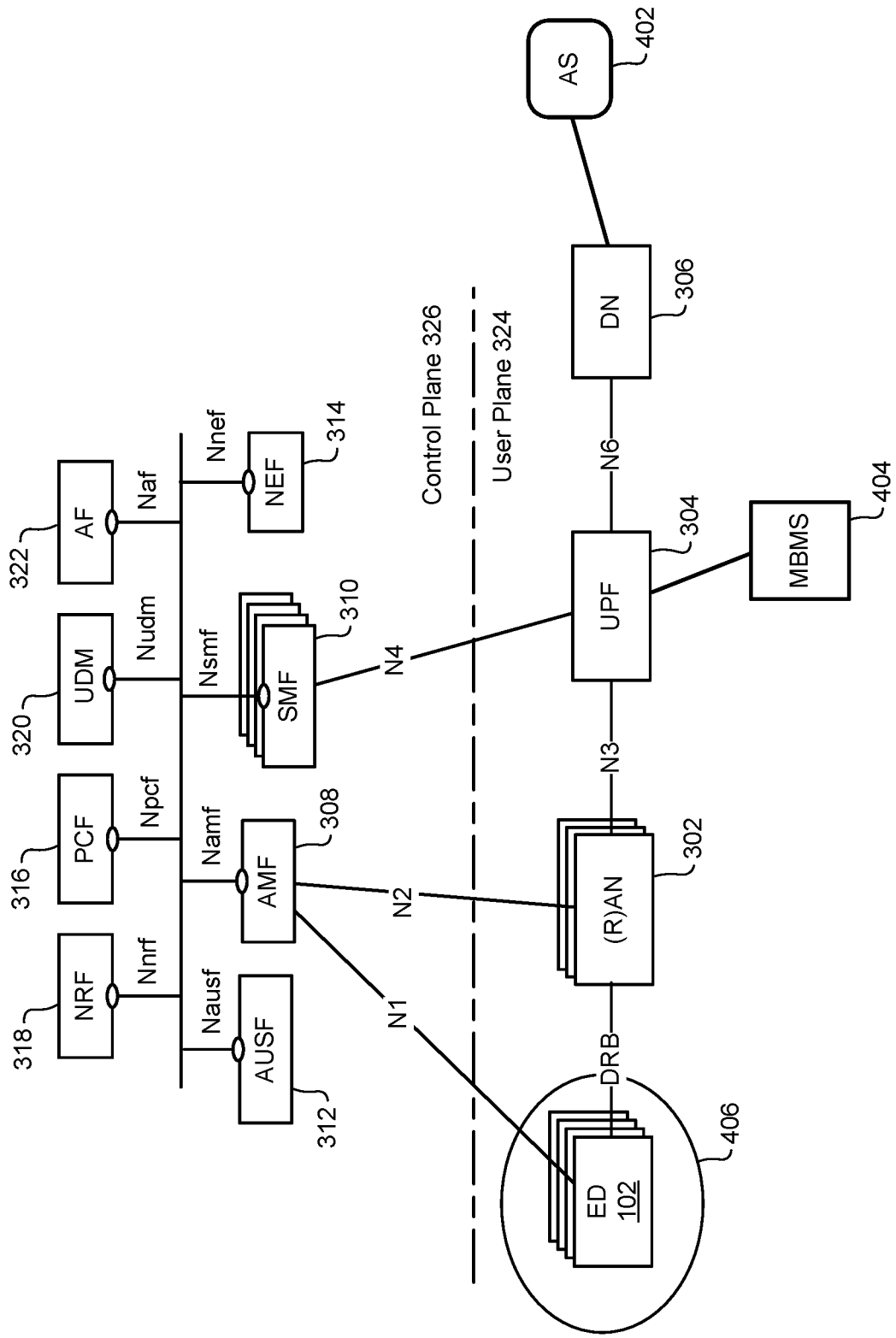
FIG. 4 is a block diagram illustrating a service-based view showing an MBMS service implemented in a 5G Core Network.

FIG. 4 is a block diagram illustrating an example MB and Broadcast Multimedia Subsystem (MBMS) implementation in the Core Network 300. In the example of FIG. 4, the MBMS subsystem 404 may be connected with one or more UPFs 304 and other network functions. An arbitrary number (one or more) EDs 102 may be associated with a ED group 406, which may be identified (for example in the SMF 310 and EF 314) by a ED Group ID (EDGID). The ED Group ID could be Internal-Group Identifier (ID) as defined in 3GPP TS 23.501 Version 1.3.0, published in November 2017, or Temporary Mobile Group Identifier (TMGI). The EDs 102 within a particular ED group 406 may be associated with each other by any desired criteria such as, for example, geographical location (e.g. EDs located in a particular building), function (e.g. EDs configured to perform a specific function), or service (e.g. EDs associated with a specific IoT, or V2X service or public safety, or video streaming group, or TV broadcasting group). In some embodiments, all of the EDs 102 within a particular ED group 406 may be connected to a single (R)AN node 302. In other embodiments, the EDs 102 within a particular ED group 406 may be connected to the core network via two or more different (R)AN nodes 302.

In accordance with MBMS, the MBMS 402 may select a file to be MB or broadcast o each of the EDs 102 within the ED Group 406. The selected file may be downloaded from the AS 402 to the MBMS 404, and information identifying the ED group 406 (such as the EDGID) supplied to the UPF(s) 304 associated with the MBMS 404. Based on this information, the UPF(s) 304 may obtain address information for each ED 102 within the group (from the SMF 301, for example), and set up connections to each involved ED 102. Once suitable connections have been established, the UPF(s) 304 may forward the selected file to each ED 102 within the group 406. During the course of downloading the file to a specific ED 102 within the group, the application layer of ED 102 may interact with the MBMS 404 in a conventional manner to recover lost packets or correct other errors in the transmission.

As may be appreciated, the connections established between the UPF(s) 304 and each ED 102 within the groups are effectively unicast connections. In some cases, tunneling between UPF 304 and the (R)AN node 302 may reduce the overhead associated with these connections, but the UPF 304 still need to support a respective point-to-point connection to each involved ED 102. Furthermore, each ED 102 must be capable of application-layer error detection and handling, in order to detect whether or not the whole file has been correctly received, and request MBMS 404 to re-transmit the missing packets of file if an error has occurred. This arrangement is suitable for video broadcasting and streaming services, and is usable for other specialized services such as public safety. However, many devices do not support the MBMS functionality. For example, some IoT devices may not support application-layer error handling at all, and may include only basic physical layer error detection. Therefore, it is desirable develop alternative solutions for 5G systems to support multicast and broadcast transmission for devices that do not support MBMS protocol stack.

In the following, the term "MB Service" is used to indicate a Multicast or Broadcast type data transfer service provided by a communication network, such as the 3GPP 5G system, to send MB-Data from an Application Server to a specific group of EDs. Membership in a specific ED group may be based on any suitable criteria. For example, an ED group may be based on a combination of ED function, geographical region or distribution, service (such as an IoT service) with which the EDs are associated, or service provider with which the EDs are associated The communication network establishes an MB Session to provide an MB Service requested by an entity, such as an Application Function, or Application Server, or by a network function of the communication network. The term "MB-Data" refers to the data that is (or is intended to be) transmitted to the member EDs of a specific ED group during the course of an MB session. MB Data typically comprises one or more packets (or, more broadly, Protocol Data Units).

Major problems to be solved may include.
How to establish an MB Session within the CN and RAN for single message and file delivery without using the MBMS protocol stack 404.
How the Application Function 322 and Application Server 402 interact with the CN 300 to establish an MB Session to send MB data at any time or at a scheduled time.
How to ensure reliable end-to-end packet delivery between the entity that request MB Service, such as Application Server 402, and each ED 102 within the ED group 406.

The present invention does not use MBMS, but rather provides transmission and retransmission schemes that still allow EDs to acknowledge the successful reception of the message or whole data file.

In some embodiments, each RAN node 302 is configured with a data buffer for storing the MB-Data packets or data file. If some EDs receive erroneous packets, the EDs may request retransmission of the missing MB-packets. This arrangement is beneficial in that it enables existing physical layer error detection methods in the ED 102 to be used to ensure proper reception of all of the packets on a MB Session.

Specific embodiments of the present invention may work with both file delivery and single packet delivery. Key points include:
The AF or Network Management sends request to establish a MB session. The AF 322 sends the request to the NEF 314. The message may include an indication of ED group, such as External Group ID. The message may include a list of identifiers of the EDs, such as, for example: Generic Public Subscription Identifiers (GPSI), Subscriber Permanent Identifiers (SUPIs), Mobile Subscriber Integrated Services Digital Network Numbers (MSISDNs), or External Identifiers. The message may also include information to identify location of services, such as Geographical Zone ID(s) or Address of (R)AN nodes. The message may include Network Slice information (for example S-NSSAI(s)). The message may include indication of start time of the MB Session and duration or end time of the MB Session. The Network Management sends request to SMF(s). The message may include indications similar to those in the message from the AF. For example, the message may include a ED Group ID (such as Internal-Group ID or TMGI (Temporary Mobile Group Identifier)). The message may include a list of identifiers of EDs, such as, for example: Generic Public Subscription Identifiers (GPSI), SUPIs, MSISDNs, or External Identifiers. The message may also include information to identify location of services, such as Geographical Zone ID(s) or Address of (R)AN nodes.

The SMF may assign an MB Session ID, which may be unique within the whole PLMN, or unique within one ED group, or unique within an SMF, or unique within an AMF.

The SMF may dynamically establish, modify and release the MB Session.

During or after an ED performs its Registration procedure, the AMF 308 may select an SMF 310 to serve MB data transmission for a ED Group ID that the ED 102 belongs to. The selected SMF 310 knows the ED location (i.e. the (R)AN address). The selected SMF 310 may also subscribe to the NEF 314 for event notifications related to ED ID or ED Group ID (such as Internal-Group ID or TMGI). The NEF 314 may have a locally stored map between the External Group ID and the ED Group ID (such as mapping between External Group ID and Internal-Group ID). The NEF 314 can also map the external ED identifier with another ED ID, such as SUPI, understandable by the SMF 310. The NEF 314 may forward the request from AF 322 to SMF 310 for the MB Session, that the SMF 310 subscribed to event notification service of NEF 314 based on the Internal-Group ID or ED IDs.

The following paragraphs provide detailed descriptions of the invention by way of four representative embodiments.

The procedures are described by the messages exchanged among network entities. These messages may be implemented by using service-based messages described in 3GPP TS 23

In a first embodiment (Embodiment 1), the Application Server 402 sends Downlink (DL) MB data (comprising one or more packets or files, for example) to the UPF 304. In this embodiment, the UPF 304 stores the DL MB data sent from the Application Server 402. This is to improve the reliability so that the UPF 304 may use a transport protocol, such as TCP/IP, to acknowledge reception of the DL MB data sent from the AF 322. When the MB Session starts, the UPF 304 transfers the DL MB data to the (R)AN nodes 302, which operates to transmit the DL MB data to each ED 102 that is associated with the applicable ED group and is within its serving area. In this embodiment, the (R)AN node 302 stores the DL MB data sent from the UPF 304, so that it can retransmit packets to a particular ED 102 if needed.

Figure 5A:
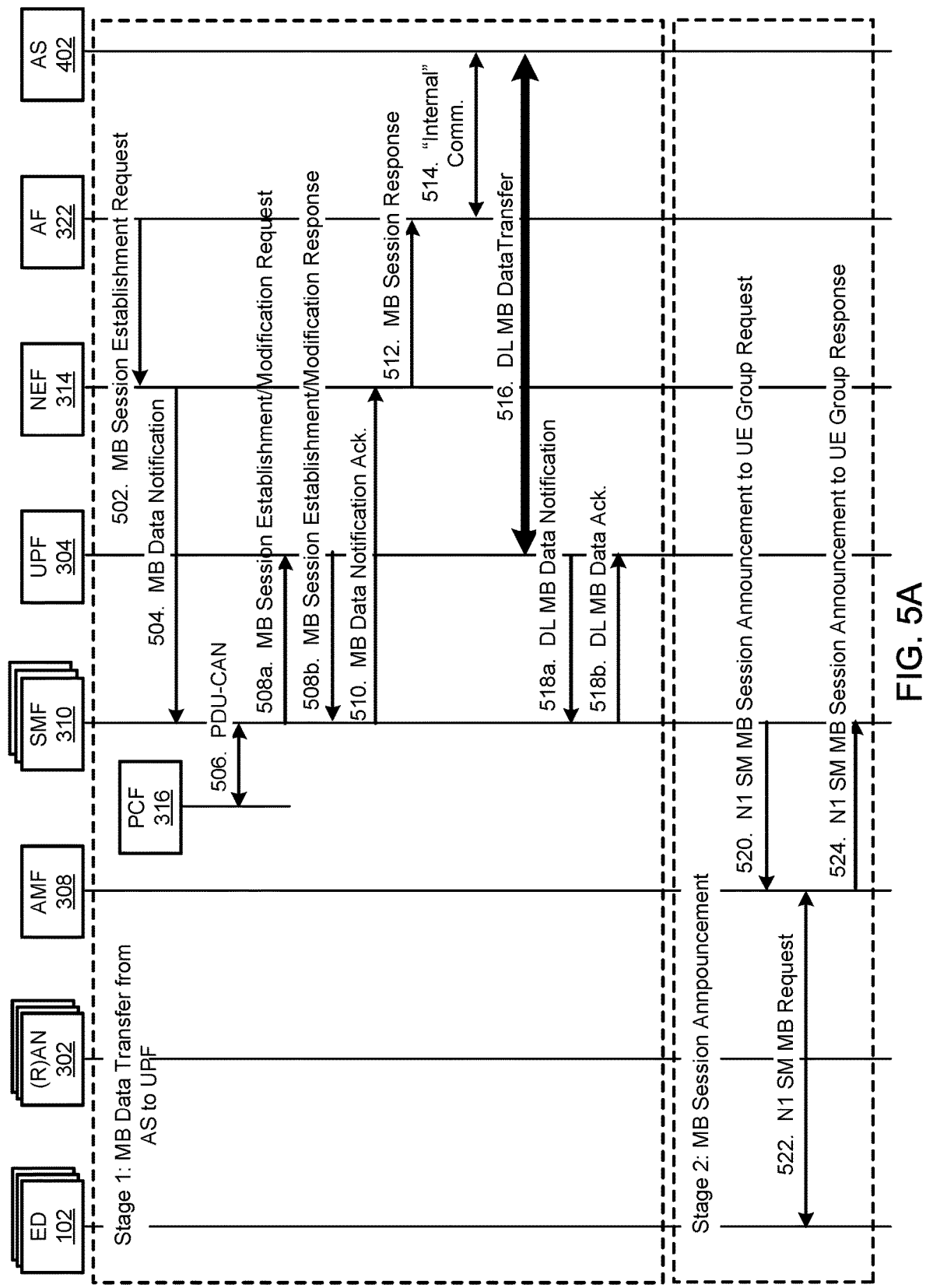
FIGS. 5A and 5B are a message flow diagram illustrating MB Data Transmission in accordance with a first representative embodiment of the present invention.
Figure 5B:
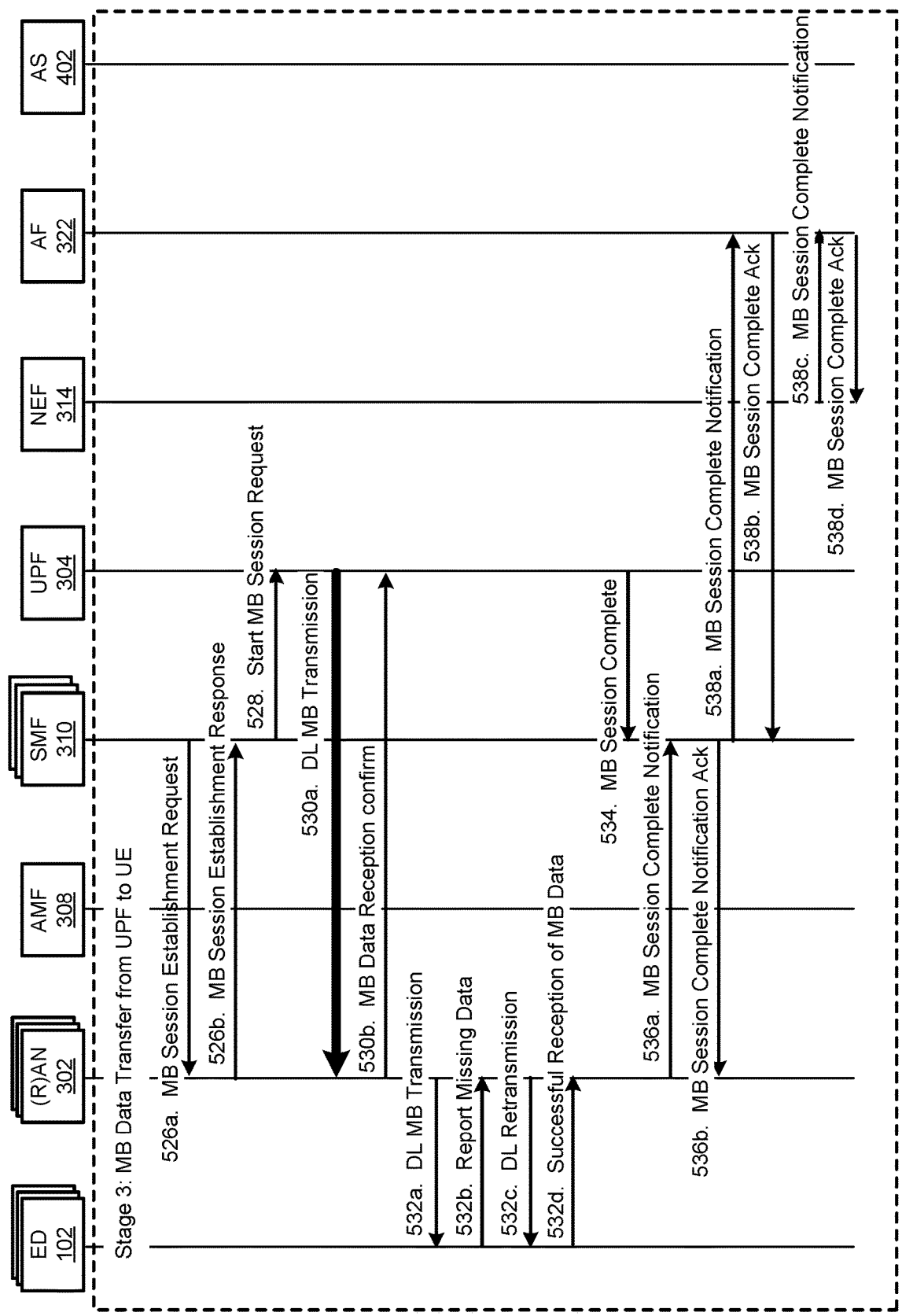

FIGS. 5A and 5B are a message flow diagram illustrating MB data Transmission via UPF, according to an embodiment. Referring to FIG. 5A:

Step 502: The AF 322 sends a MB Session Request to the NEF 314. This message may include parameters such as: Information to identify AS 322 (such as AF-Service-Identifier) that AF 322 represents, Information to identify ED group (such as External Group ID), information to identify EDs (such as Generic Public Subscription Identifiers (GPSI) or SUPIs, or MSISDNs, or an External Identifiers); a session start time (or session deadline); Session duration or Session end time; a data volume, QoS requirements, reliability requirement, Address information of AS 402 (such as IP Address or IP Prefix, and Port Number).

For certain MB applications, the AS 402 may send a single packet or multiple packets at random times to multiple EDs only. In this case, the session start time and data volume may be omitted.

The External Group ID may be used to identify EDs 102 that are intended to receive the message. Alternatively, the AF 322 may send different information to identify EDs, such as: a list of ED IDs (such as Generic Public Subscription Identifiers (GPSI) or SUPIs, or MSISDNs, or an External Identifiers), Packet Flow Descriptions (PFDs), Application ID, Network Slice Information (S-NSSAI), Location information of MB Session (such as Geographical Locations or Geographical Zone Identifier, or Addresses of (R)AN nodes 302).

The QoS requirements may include the data rate to send to the EDs. The reliability requirement indicates whether acknowledgement messages are to be sent to confirm successful delivery of packet or file to each ED, as well as indicating the data delivery protocol to be used from the AS 402 and UPF 304, or the data delivery protocol to be used between the AF 322 and NEF 314.

In some embodiments, the NEF 314 selects the SMF 310. Examples of this selection process are set out below.

Step 504: Following receipt of the MB Session Request from the AF 322, the NEF 314 may use the External Group ID or ED ID to find which SMF(s) 310 are serving the identified ED Group 406 and inform SMF(s) 310 about the DL MB Session information received from the AF 322. The SMF 310 may register with the NEF 314 for receiving notifications regarding any one or more of a specific Internal-Group ID, a specific External Group ID, and a specific ED ID. There may be a mapping between Internal Group ID and External Group ID locally stored or configured in the NEF 314.

If the information to identify EDs is different from an External Group ID, the NEF 314 may have a functionality to identify the serving SMF(s) 310. For example, if the PFDs are included in the MB Session Request (502) sent from the AF 322, the NEF 314 may use a Packet Flow Descriptions Function (PFDF) to identify the SMF 312 that have been linked to the PFD (by for example a the SMF(s) 310 that subscribed to the PFDF for services related to PFDF and Application ID).

Alternatively, the NEF 314 may request an NRF 318 (not shown in FIG. 5A) to discover an SMF 310 that serves the Internal-Group 406 or a geographical area, or a Network Slice instance (represented by S-NSSAI). The NEF 314 may be configured by a Network Management Function (NMF) about the address of the NRF 318. The NEF 314 may provide any one or more of: Geographical Locations information, Network Slice Information, AF-Service-Identifier, Internal-Group ID (if the NEF 314 has been configured), or Application Identifier to the NRF 318 to select an SMF 310. The NRF 318 may return information on the selected SMF 310 to the NEF 314, which could be the Address of the SMF 310.

Alternatively, the SMF information may be configured in the NEF 314 by a Network Management function. The NEF 314 may select an SMF 310 to serve the new MB Session by using locally stored information.

Alternatively, if the MB Session is already established for a Internal-Group 406 or for a geographical area, the NEF 314 may know the SMF 310 that serves the MB Session.

Alternatively, the SMF may subscribe to the NEF for notification messages related to specific EDs. The NEF 314 then knows which SMF 310 is serving the ED 102.

Note that the MB Session Request 502 from AF 322 may be supported by multiple SMF 310, in which each SMF 310 may serve specific locations.

Step 506: The SMF 310 may generate a MB Session ID. The SMF 310 sends a request to establish a MB-CAN session with the PCF 316. The message may include Internal-Group ID, TMGI, and MB Session ID. The PCF 316 may send to the SMF 310 the PCC rules for the Internal-Group 406, or TMGI, and the MB Session. The MB-CAN session is used for the PCF 316 to provide dynamic policy updates to the SMF 310.

Note that if an ED Group ID is required and the SMF 310 does not know the ED Group ID, the SMF 310 may request the UDM 320 to generate a unique ED Group ID (such as Internal-Group ID, or TMGI) within the PLMN. Alternatively, the SMF 320 may generate an ED Group ID, which is unique within the SMF 320.

The SMF 310 may create an MB Session Context locally stored in the SMF. The MB Session Context in the SMF may contain all the information related to the MB Session known by the SMF 310.

Step 508a: The SMF may select one or multiple UPFs 304 to serve the MB Session. The information for SMF to select UPF for the MB Session is described in TS 23.501. Additionally, the SMF may consider the NEF Address and connection topology of UPF(s) 304 (logical connection topology or physical connection topology). After selecting UPF, each SMF 310 sends MB Session Establishment Request to the UPF(s) 304 to establish a MB Session. In some embodiments, this message configures the UPF 304 to prepare for the MB session by allocating resources (including buffers) for the MB session. The message may include MB Session ID, ED Group ID, Buffer management in the UPF (e.g. DL buffer size), AS information (e.g. Source IP Address or Source IP Prefix and Source UDP Port of the AS 402), (R)AN information (e.g. (R)AN Addresses and (R)AN DL Tunnel Endpoint Identifiers (TEIDs)), IP Address or IP Prefix and Port number for UPF to use for sending messages to the AS 322 over N6 interface, and PCC rules (e.g. QoS profiles, specifying MB traffic volume that may be sent in certain period, charging rules) to the UPF 304. The message may include an instruction for the UPF 304 whether to keep or delete the (R)AN information or MB Session context after the UPF 304 successfully sends all the data to the (R)AN 302. If the SMF 310 is in charge of assigning UL TEID(s), the SMF 310 also include the UL TED in the message send to the UPF 304, so that each (R)AN node 302 may send UL message to the UPF 304. Each (R)AN node 302 may be assigned a unique UL TEID for each MB Session.

If the MB Session has already been established, the SMF 310 may send an MB Session Modification Request to modify the existing MB Session as needed for the DL MB data (e.g. new QoS parameters, buffer size, address(es) of (R)AN nodes to be added or removed from the MB Session, etc).

Step 508b: Following receipt of the MB Session Establishment/Modification Request from the SMF 310, the UPF 304 may send a response message to the SMF 310 confirming the resource establishment/modification in the UPF 304. In case the UPF 304 is in charge of generating UL TEID, the UPF 304 includes in the response message UL TEID(s) for each of the (R)AN nodes so that the (R)AN node 302 may send UL message to the UPF.

The UPF 304 may create a MB Session Context locally stored in the UPF 304. The MB Session Context may contain all information related to the MB Session and known by the UPF 304.

Step 510: The SMF(s) 310 sends an acknowledge (Ack) message to the NEF 314 as a response to the MB Data Notification received from the NEF 314 at step 504 above. This Ack message may indicate that the UPF(s) 314 is(are) ready to receive DL MB data. The message may include Address information of UPF to be use in N6 interface, such as IP Address/IP Prefix of the UPF, and Port number (UDP or TCP port). The Ack message may include the MB Session ID, Internal-Group ID. The SMF(s) 310 may also send Subscription Request for Notification Service of the NEF 314 for ED Group ID, or ED ID(s). The NEF 314 may create an MB Session Context locally stored in the NEF 314. The MB Session Context contains all information related to the MB Session and known by NEF 314, such as AF-Service-Identifier, SMF Information, MB Session ID, mapping between External Group ID and Internal-Group ID.

Step 512: The NEF 314 sends an MB Session Response to the AF 322 including information about the UPF 304 received from SMF(s) 310 (such as a UPF N6 IP Address and port number, for example) so that the AS 402 knows which UPF(s) 304 to receive the DL MB data.

If the MB Session has been previously established, the NEF 314 may not send the UPF N6 IP Address information.

Note that it may be possible that request for establishing a new MB Session may be not successful. For example, the SMF knows the limit of number of MB Sessions. If the limit has been reached, the SMF 310 may send a reject message to the NEF 314 in step 510. The NEF 314 then informs the AF 322 about the rejection with a cause code (for example, network resources not available). The other steps of this procedure are skipped.

Step 514: The AF 322 communicates with the AS 402, for example to provide the destination IP address and maybe port number of the UPF 304 to the AS 402.

Step 516: The AS 402 sends DL MB data to the UPF(s) 304 via the provided N6 interface information. The UPF(s) may buffer the DL MB data. In some embodiments, a transport protocol or file transfer protocol may be used to guarantee reliable packet delivery on the N6 interface. For example, the UPF 304 may acknowledge individual packets for in-order delivery. In some embodiments, a TCP session may be used to convey the DL MB data between the AS 402 and the UPF 304. In some embodiments, the HTTP file transfer protocol may be used to send data from the AS 402 and the UPF 304.

Step 518a: After receiving the DL MB data from the AS 402, the UPF 304 may send a DL MB data notification to the SMF 310 to inform the SMF 310 about DL MB data. This message can indicate the completion of the delivery of the data for the MB session; e.g., an entire file associated with the MB session has been received and buffered by the UPF 304.

Step 518b: In response to the DL MB data notification message from the UPF 304, the SMF 310 may send a DL MB Data Acknowledgment message to the UPF 304. In some embodiments, the DL MB Data Acknowledgment message may include an instruction that the UPF 304 to store the DL MB Data for transmission after the UPF 304 sends all packets to the (R)AN 302 MB Session. The message may include an instruction for the UPF 304 whether to keep or delete the (R)AN information and whether to keep or delete MB Session context after the UPF 304 successfully sends all the data packets to the (R)AN(s) 302.

The DL MB Data Acknowledgment message may also include optional information pertaining to the MB Session, including Start Time and (R)AN information ((R)AN Addresses and DL TEID) if not provided in step 508a, for example.

Step 520: The SMF 310 may send an N1 SM MB Session Announcement message to the ED group 102 and N11 MB Session Establishment Message to the AMF 308. In order to send N1 SM MB Session Announcement message, in some embodiments the SMF selects an AMF 308 to for the MB session. To do this, the SMF may have local information about the AMF 308. Alternatively, the SMF 310 may send a request to the NRF function to identify an AMF function. The request message may include at least one of the following: the Internal Group ID, the List of ED locations, Network Slice Information (such as S-NSSAI), Application ID. Alternatively, the AMF selection can be similar to the AMF selection method described in Embodiments 3 and 4.

The N11 MB Session Establishment message may include any one or more of: the ED Group ID (such as Internal-Group ID, or TMGI); a list of ED IDs (such as SUPI), MB Session ID; a Start Time of the MB Session; and a deadline for delivery of a corresponding SM MB Session Announcement to each identified ED). In case of broadcast data, N11 MB Session Establishment message may also include the MB Session location information (such as Geographical Zone IDs) or the list of (R)AN Addresses. The AMF may store locally the mapping of location information and Addresses of (R)AN nodes 302.

The N1 SM MB Session Announcement message may include the Internal-Group ID, MB Session Start Time, and Data volume.

Alternatively, the SMF 310 may not send the N1 SM MB Session Announcement message to the EDs 102. The AMF 310 may create an N1 MM MB Session Announcement message from the N11 MB Session Establishment request message to send to the EDs 102. The N1 MM MB Session Announcement message may contain any one or more of: the Internal-Group ID; List of ED IDs; Session Start Time and Data Volume; and a security key to decode the DL MB Data.

The AMF 308 may create a MB Session Context, which is locally stored in the AMF 308. The MB Session Context in the AMF 308 may contain some or all of the information related to the MB Session known by the AMF 308.

Step 522: In response to the N11 MB Session Announcement Request message from the SMF 310, the AMF 308 may forward the corresponding N1 SM MB Session Announcement or send the N1 MM MB Session Announcement to the identified ED group 102. In other words the AMF 308 sends the MB Session Announcement to the group of EDs 102.

Based on the ED Group ID, or list of ED IDs, or location information, the AMF 308 may forward the N1 SM MB Session Announcement or N1 MM MB Session Announcement message to the EDs 102 by any suitable method, such as Sending a Core network paging message for each ED 102 currently in a CM-IDLE state; When the ED enters CM-CONNECTED state, the AMF 308 sends the N1 SM Session Announcement or N1 MM MB Session Announcement message to the ED.

The (R)AN 302 Sends a (R)AN paging message for each ED 102 currently in an RRC-INACTIVE state; The (R)AN paging message may carry the N1 MM MB Session Announcement message or N1 SM MB Session Announcement message.

The AMF 308 waits until the ED 102 performs a Registration procedure to send the N1 SM MB Session Announcement message or N1 MM MB Session Announcement message for the ED 102 in CM-IDLE state or in the MICO mode.

The (R)AN 302 uses a (R)AN broadcast channel to send N1 SM MB Session Announcement message or N1 MM MB Session Announcement message.

If the ED is in CM-CONNECTED state, the AMF 308 sends the N1 SM Session Announcement message or N1 MM MB Session Announcement message to the ED.

Upon receiving the N1 SM MB Session Announcement or N1 MM MB Session Announcement message from the AMF 308, the ED 102 may send an Acknowledgment to the AMF 308. The AMF 308 may record which EDs 102 have received and which ED(s) 102 have not received the N1 SM MB Session Announcement or N1 MM MB Session Announcement message.

Step 524: The AMF 308 sends a N11 MB Session Announcement Response message to the SMF 310. The message may include the list of (R)AN nodes (RAN Addresses) that are part of the MB session (as they currently serve the group of EDs 102), the (R)AN nodes belonging to the geographical areas that have EDs to receive MB data. The message may also notify SMF 310 the list of EDs that receive the N1 SM message or the list of any EDs that failed to receive the N1 SM MB Session Announcement message.

Referring now to FIG. 5B:

Step 526a: Before the MB Session start or before the scheduled Start Time of the MB Session, the SMF 310 sends the MB session establishment request to the (R)AN node(s) 302 to set up resources for the MB Session. The MB Session Establishment Request message may include Source IP Address of the UPF 304, Network Slice Information (e.g. S-NSSAI), MB Session ID, QoS parameters in a QoS Profile, ED Group ID (e.g. Internal-Group ID, or TMGI), and/or a list of ED IDs in the Internal Group of EDs. The SMF 310 may include UPF information (UPF Address and UL TEID) for the MB Session. The UPF information may be used for the (R)AN node 302 to send UL messages to the UPF 304, such as to request the UPF 304 to retransmit missing or erroneous packets or acknowledge the reception of all data packets. The SMF 310 may also include DL TEID to be used by the UPF 304 to send DL packets to the (R)AN node 302. The (R)AN 302 may create a MB Session Context to store all the information related to the MB Session, which is known by the (R)AN 302.

As can be seen by the message 526a, the SMF 310 sends the MB session establishment request directly to the (R)AN node(s) 302. An alternative solution is that the SMF 310 sends 1 N11 MB Session Establishment request message to the AMF 308, which may contain the information as described above. The AMF 308 may use some information stored in MB Session Context of the AMF, or the information provided by the SMF 310, e.g. the ED Location information, or Network Slice information, or ED Group ID, Geographical Zone IDs to identify which (R)AN nodes 302 will provide MB session connection for EDs 102, and creates and sends multiple N2 MB Session Establishment request messages, each message for one (R)AN node 302.

Step 526b: Following receipt of the MB Session Establishment message from the SMF 310, the (R)AN node 302 may send a MB Session Establishment Response message to the SMF 310. The MB Session Establishment Response message may include the (R)AN's DL TEID, in case the (R)AN 302 is in charge of assigning MB DL TEID. Either the SMF 310 or (R)AN 302 may assign the DL TEID for MB Session.

Alternatively, if the AMF 308 creates the N2 MB Session Establishment request and sends it to the (R)AN 302, the (R)AN may send back to the AMF 302 the MB Session Establishment Response message carrying similar information as described above. The AMF 308 collects all the response messages from the (R)AN 302. Then the AMF 302 sends one N11 MB Session Establishment response to the AMF, which contains the information provided by the (R)AN 302.

Step 528: After collecting responses from each involved (R)AN node 302 in step 526b, the SMF 310 may send a Start MB Session Request message to the UPF 304. This message may include Address(es) of (R)AN nodes 302 that join the MB Session, their UL TEID(s), and DL TEID(s) to be used for the MB Session. The message may include an instruction for the UPF 304 whether to keep or delete the (R)AN 302 information and/or whether to keep or delete the MB Session context after the UPF 304 successfully sends all the data to the (R)AN 302. The UPF 304 may send an MB Start Session Response to the SMF 310.

Step 530a: The UPF sends the DL MB Data to the (R)AN(s) 302. During the data transmission session, each involved (R)AN node 302 may send Ack and NAck signals for the successfully received or missing packets, respectively, as indicated by 530b.

Step 530b: The (R)AN node(s) 302 confirms successful reception of the DL MB Data. The confirmation may be sent for a single packet, for a group of packets, or for the whole all packets. For example, the packet sent from the UPF 304 is sent over a tunnel between the UPF 304 and (R)AN 302. The tunnel encapsulation header includes a packet sequence number and an indication to mark the end of file (or the last packet, or the end of session). The (R)AN 302 can use any one or more of the packet sequence number, the end-of-file indication, and the file size information to detect the missing packets. The (R)AN 302 shall inform the UPF 304 about the missing packets. The UPF 304 may then resend the missing packets.

Step 532a: Each involved (R)AN node 302 (e.g. gNBs) is configured with a data buffer to enable transmission and retransmission of DL MB Data packets to each ED 102 within the group. The (R)AN node 302 may use any suitable method or combinations of any methods to send data to the EDs 102. For example, one or more of:
  Special subframes (like MBSFN) for broadcast transmission channel
  Single-Cell Point-to-Multipoint (SC-PTM) transmission channel
  Unicast data channel (Data Radio Bearer—DRB)
  Paging channel
  Broadcast channel
  gNB pages the EDs 102 to access a DL DRB for MB data.

Step 532a may start before step 530b, after step 530a when a packet is successfully received by the (R)AN 302.

During the first transmission phase, the EDs 102 may or may not report missing packets until the (R)AN node 302 indicates that all the data packets of the DL MB Data have been sent.

Step 532b: ED 102 reports missing packets (or the missing air interface physical layer RLC PDU, or PDCP PDU) by an uplink access stratum signaling channel. It should be appreciated that this message can be considered a request to retransmit the missing packets.

Step 532c: (R)AN node 302 may retransmit missing air interface packets requested to be retransmitted as part of step 532b by any suitable method or combinations of the methods identified in step 532a above, or other methods, if desired. In some embodiments, the RAN 302 retransmits the requested packets to all members of ED group 102. In other embodiments, the RAN 302 retransmits the requested packets only to the EDs which requested retransmission.

Step 532d: ED 102 confirms reception of all MB packets by comparing the received data volume and the data volume in the N1 SM MB Session Announcement message or N1 MM MB Session Announcement message received from the AMF 308 in step 522, or by checking sequence number of physical layer data packet in RLC or PDCP layer and the end of data marker sent from the (R)AN 302.

Step 534: When all DL MB Data has been sent from the UPF 304 to the (or each) (R)AN node 302 (at step 530a), the UPF 304 may send to the SMF 310 a MB Session Complete message as a response to the Start MB Session Request message in step 528 and to notify the SMF 310 about successful data delivery to (R)AN 302. The UPF 304 may keep or delete (R)AN information or any stored MB Session Context information, as instructed by the SMF 310 in step 508b, step 518b, or step 528.

Step 536a: The (R)AN node 302 may send a MB Session Complete Notification message to the SMF 310 to indicate completion of the MB Session. The MB Session Complete Notification message may include the ED IDs of any EDs 102 that did not join the MB data session and/or failed to receive all the data packets. This can be important for important MB transmissions such as software updates, in which case it important to identify which EDs were not updated.

Step 536b: The SMF 310 may send a MB Session Complete Notification Acknowledgment message to the (R)AN node 302 to acknowledge receipt of the MB Session Complete Notification message. The message may contain an instruction to for the (R)AN to keep or delete any stored UPF 304 information, or keep or delete MB Session Context information.

Step 538a: The SMF 310 may directly notify the AF 322 about completion of the MB Session for the ED Group ID. The message may include the ED Group ID (e.g. Internal-Group ID, or TMGI), the list of ED IDs that received the MB Data, or the list of ED IDs of any EDs 102 that did not receive the DL MB data. Alternatively, the SMF 310 may indirectly notify the AF 322 about completion of the MB Session for the Internal or External Group ID via NEF 314. The NEF 314 may convert the ED Group ID (e.g. Internal-Group ID, or TMGI) to External Group ID and send the message to the AF 322. This can be important for important MB transmissions where verification of the transmission to determine the need for retransmission is desirable.

Step 538b: Following receipt of the MB Session completion message from the SMF 310, the AF 322 sends an acknowledgment to the SMF 310 directly or via NEF 314. The message may include the External Group ID.

An alternative implementation of step 538 is described below, in which the SMF 310 first notifies the NEF 314 about the completion of MB Session. The NEF 314 then notifies the AF 322 about the completion of the MB Session:

Step 538a: The SMF 310 sends the MB Session Complete Notification to the NEF 314. The message may include the ED Group ID (e.g. Internal-Group ID), the list of ED IDs that received the DL MB Data successfully or the list of ED IDs that have not received the DL MB Data.

Step 538b: The NEF 314 may send an MB Session Complete Notification Acknowledgment (Ack) to the SMF 310.

Step 538c: The NEF 314 notifies the AF 322 about completion of MB Session for the External Group ID. The NEF may convert the ED Group ID (e.g. Internal-Group ID, or TMGI) into External Group ID and sends the External Group ID and the other information received from the SMF 310 to the AF 314.

Step 538d: The AF 322 acknowledges NEF 314 for step 538a.

Note that the above procedure includes steps to establish UP between AS 402 and (R)AN nodes 302 for MB Session from the AS 402 to the (R)AN nodes 302. If the MB Session is kept for long time, the SMF 310 shall instruct the (R)AN nodes 302 and UPF 304 to keep the MB Session Context after delivering all the data. When the AS 402 sends a new packet, the packet can be sent to multiple (R)AN nodes 302 without holding the packets in a buffer of the UPF 304. However, the UPF 304 and (R)AN nodes 302 may still provide a mechanism for acknowledgment of individual packets or the whole data file. This implementation also allows the possibility that the AS 402 may not need to send MB data before the start time of MB session. The AS 402 may sends MB data towards mobile network any time after the user plane connection in the mobile network for the MB session is established.

Benefits of the above-described process may include:
Complete separation of RAN and CN functionalities: The CN is in charge only the packet or file delivery to (R)AN nodes. The (R)AN node selects its own transmission method(s) (types of DRB) for data transmission to the EDs.
End-to-end reliable MB service: packets and data file can be reliably delivered from Application Server to UPF. The UPF has caching function to deliver packets to RAN nodes. RAN nodes have their own packet retransmission solution to correct errors in the air interface physical layer. The RAN then reports successful file deliver status to the SMF, and SMF reports file delivery status to the AF.

In another embodiment (Embodiment 2), the AS 402 sends the DL MB Data to the NEF 314 before the MB Session starts. At the start time of MB Session, the NEF 314 forwards the DL MB Data to the UPF 304, which then forwards the DL MB Data to the (R)AN nodes.

Figure 6A:
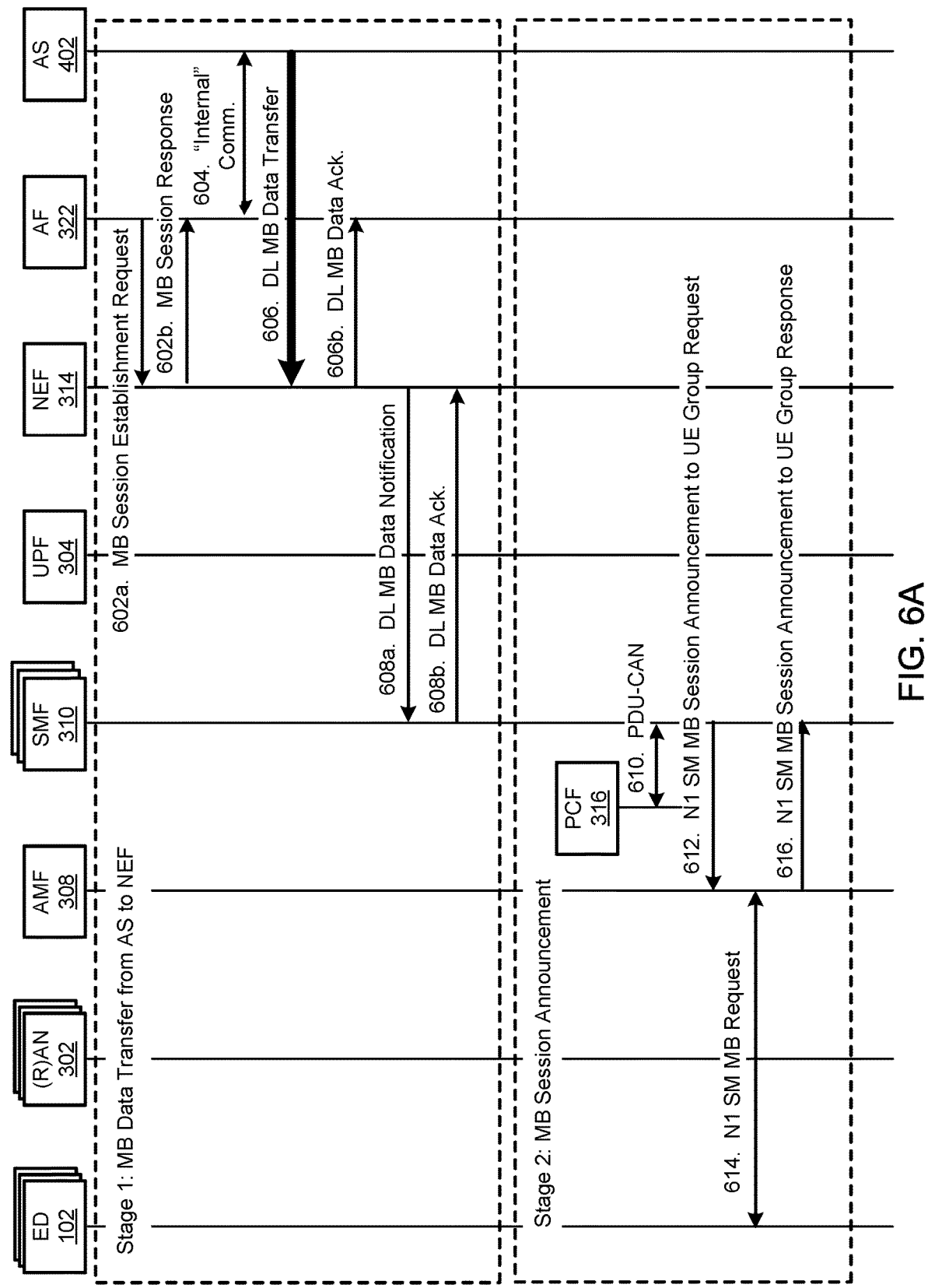
FIGS. 6A-6C show a message flow diagram illustrating MB Data Transmission in accordance with a second representative embodiment of the present invention.
Figure 6B:
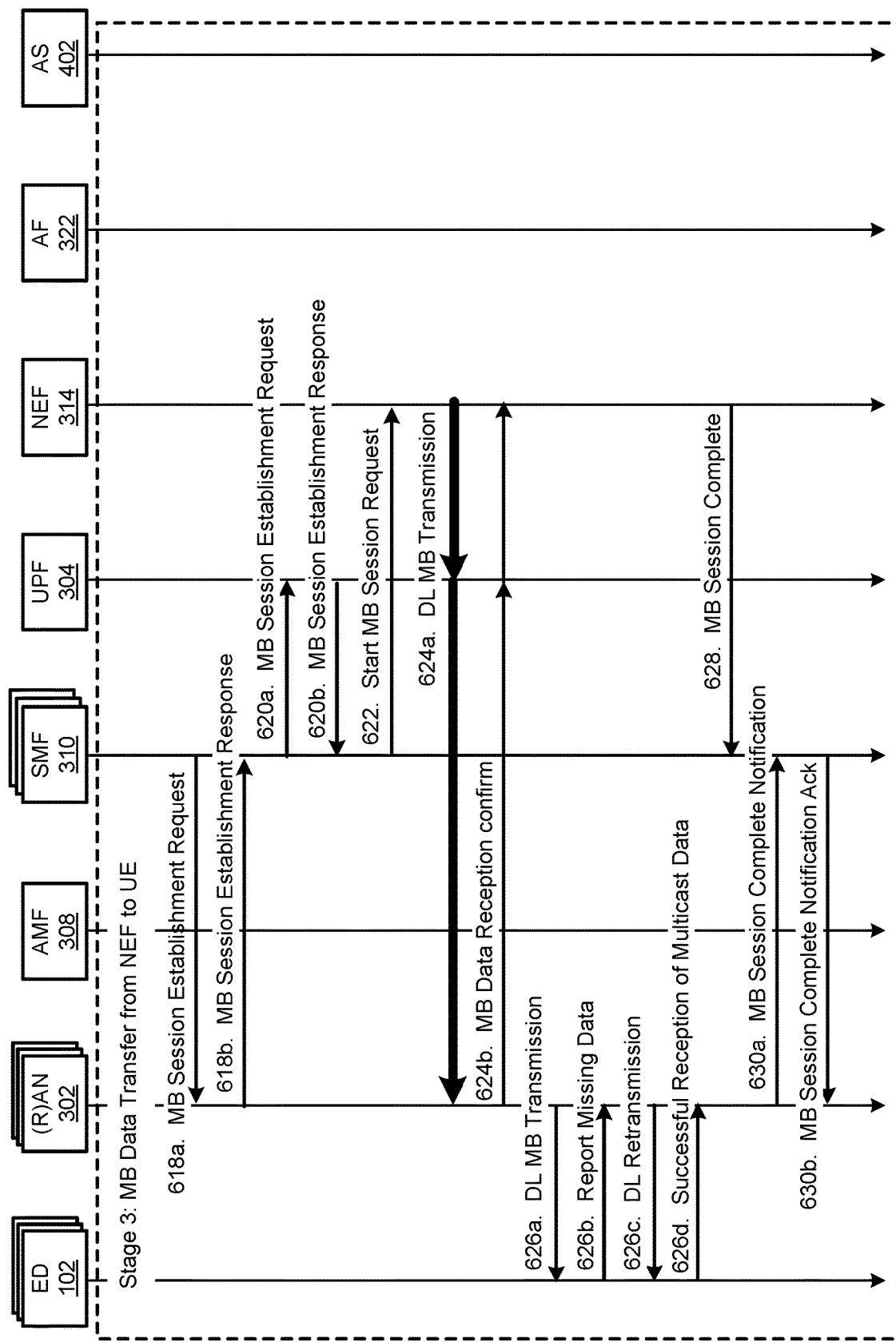
Figure 6C:
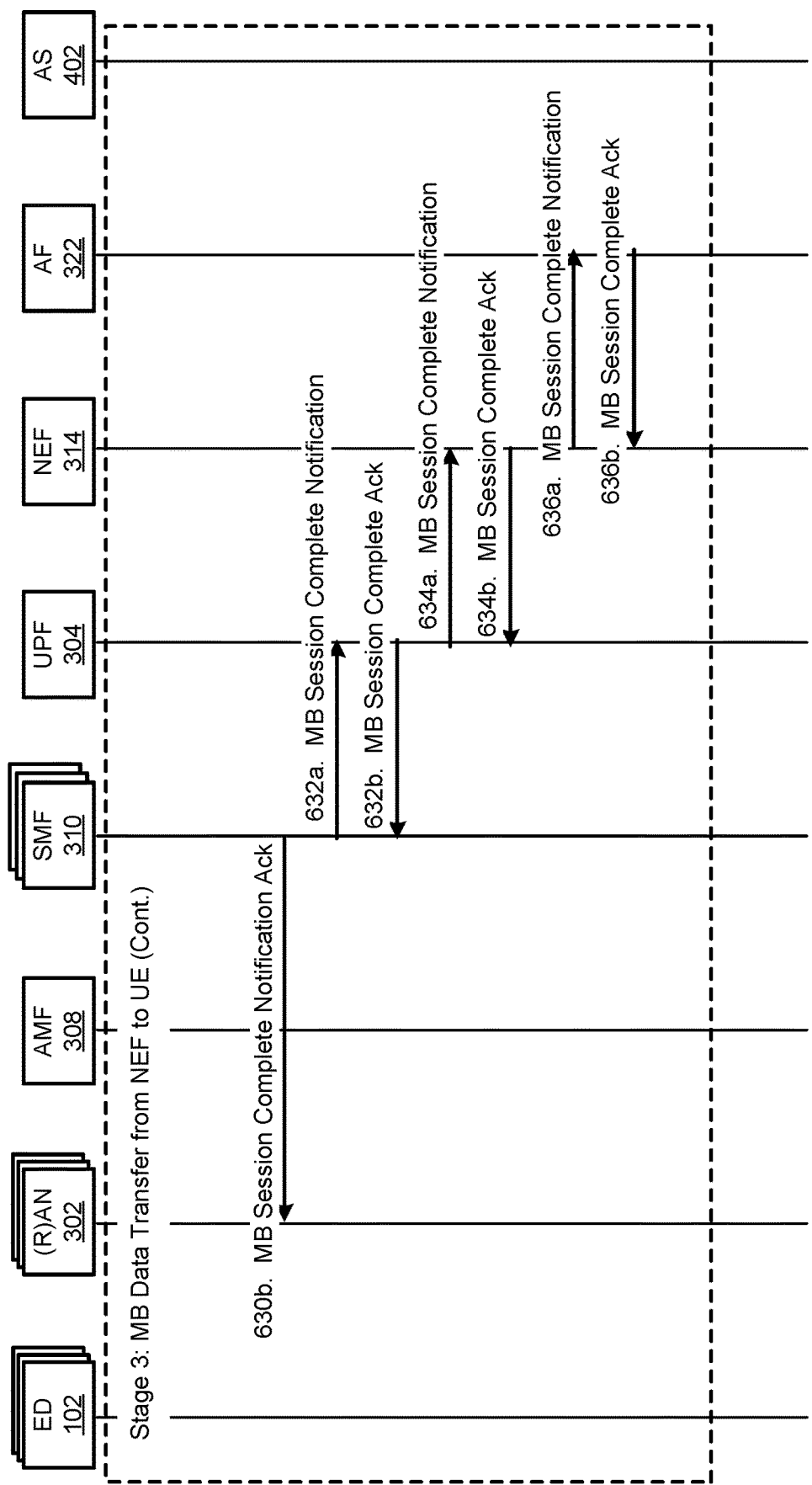

FIGS. 6A-6C are a message flow diagram illustrating MB Data Transmission via NEF. Referring to FIG. 6A:

Step 602a: The AF 322 sends a MB session request to the NEF 314. This message may include parameters similar to those in Step 502 in Embodiment 1, such as Start time of session (or session deadline), and ED information to receive MB data. The ED information may include any one or more combinations of: External Group ID, list of identifiers of EDs (such as Generic Public Subscription Identifiers (GPSI) or SUPIs, or MSISDNs, or an External Identifier), Application ID, Network Slice Information (e.g. S-NSSAI), Packet Flow Descriptions, ED geographical locations, address information of AS 402 (such as IP Address or IP Prefix, and Port Number), QoS requirements. The QoS requirements may include the data rate to send to the EDs. The reliability requirement indicates whether acknowledges to confirm successful delivery of packet or file to each ED.

For certain MB applications, the AS 402 may send a single packet or multiple packets at random times to multiple EDs only. In this case, the session deadline and data volume may be omitted.

Step 602b: Acknowledgment for ED-group session request 602a. This acknowledgement may include the address of the NEF 314 to receive the DL MB Data.

Step 604: The AF 322 communicates with the AS 402, for example to provide the destination IP address of the NEF 314 to the AS 402.

Step 606a: The AS 402 sends DL MB data to the NEF 314. The NEF 314 may buffer the DL MB data. The NEF 314 may acknowledge individual packets for in-order delivery. In some embodiments, a TCP session may be used to convey the DL MB data between the AS 402 and the NEF 314.

Step 606b: Confirm reception of all MB data.

Step 608a: Based on the received ED Information, the NEF 314 may identify the SMF(s) 310 that serves the EDs 102. For example, if the ED information is External ED Group ID, the NEF 314 may inform the SMF(s) 310 that have subscribed to receive notifications for some Internal Group ID, or External ED Group ID, or ED ID. If the ED information is PFD or Application ID, the NEF 314 may use PFDF to identify the SMF 310 that has been linked to PFDs or Application IDs. The NEF 314 may use other methods to identify the serving SMF 310, for example by communication with PCF 316, or NRF, or NSSF or any combinations of these functions. The NEF 314 may use other methods described in step 504 of Embodiment 1 to discover the SMF(s) 310 that serves the ED.

The NEF's notification message to the SMF contains the MB Session information received from the AF, such as Start Time of MB Session, or deadline for sending MB data to the ED, and NEF information (e.g. NEF Address and TED for UL communications) to be used by the SMF 310 and/or UPF 304 to communicate with NEF 314.

Step 608b: Acknowledgment for step 608a. The message may include the UPF information (UPF Address and DL TEID) for the NEF 314 to sends DL data to the UPF 304.

Step 610: If the ED Group ID exists, the SMF 310 may send a request to establish a PDU-CAN session with the PCF 316. The message may include ED Group ID and MB Session ID. The PCF 610 may send to the SMF the PCC rules for the ED Group and MB session.

If the ED Group ID (e.g. Internal-Group ID and/or TMGI) does not exist, the SMF 310 may request the UDM 320 or the UDR 321 to create a new ED Group ID (e.g. Internal-Group ID or TMGI). The SMF 310 may send information to identify EDs 102 such as external ED Group ID (e.g. External Group ID), the list of EDs, Network Slice Information (e.g. S-NSSAI), AF-Service-Identifier, to the UDM 320. The UDM 320 may obtain ED subscription data from the UDR 321; the UDM 320 may request the PCF 316 to create new policies for the new ED Group ID for MB service, according to a service level agreement (SLA) with the service provider.

Step 612: This step is similar to step 520 of Embodiment 1.

Step 614: This step is similar to step 522 of Embodiment 1.

Step 616: This step is similar to Step 524 of Embodiment 1. The AMF 308 may send to the SMF 310 an N1 SM MB Session Announcement Response message which may contain the list of EDs that receive the N1 SM message or the list of EDs that failed to receive N1 SM message. The message may include the list of (R)AN nodes (RAN Addresses) that currently serve the ED, the (R)AN nodes belong to the geographical areas that have EDs to receive MB data.

Referring now to FIG. 6B:

Steps 618a and 618b are similar to steps 526a and 526b of Embodiment 1, respectively.

Step 618a: SMF to (R)AN: Before the Start Time of broadcast session, the SMF 310 requests the (R)AN node 302 to set up resources for the MB Session. The message may include: Source IP Address, MB Session ID, QoS parameters, Internal Group ID, list of EDs in the ED Group. Optionally, the SMF 310 may include DL TEID for the MB Session. The SMF 310 may include UPF information (UPF Address and UL TED for the MB Session). The UPF information may be used for the (R)AN node 302 to send UL messages to the UPF 304, such as to request the UPF 304 to retransmit missing or erroneous packets, or acknowledge the reception of all data packets.

Step 618b: The (R)AN 302 responds to the request message from the SMF 310 (step 318a). The response message sent by the (R)AN 302 may also include its DL TEID, in case the (R)AN 302 is in charge of assigning MB DL TEID. Either the SMF 310 or (R)AN 302 may assign the DL TEID for MB Session.

Step 620*a*: After collecting responses from each involved (R)AN node 302 in step 618*b*, the SMF 310 sends a MB Session Establishment Request to the UPF(s) 304. The message may include MB Session ID, (R)AN information (e.g. (R)AN addresses and UL TEID(s)), DL TEID, NEF Address and Tunnel information (DL TEID) that connects UPF 304 to the NEF 314, QoS information, charging information. The message may include an instruction for the UPF 304 whether to keep or delete the MB Session context after the UPF 304 sends all the data to the (R)AN 302.

Step 620*b*: The UPF 304 may respond to the MB Session Establishment Request message by sending a MB Session Establishment Response message to the SMF 310.

Step 622: When all the UP connections have been established, the SMF(s) 310 sends to the NEF 314 a Start MB Session Request message. This message may contain UPF Address(es) and DL Tunnel information (TEID) for the NEF 314 to send downlink packets to the UPF(s) 304.

The tunnel protocol for UP connections is designed to provide reliable packet delivery between the NEF 314 and UPF(s) 304, and between the UPF 304 and (R)AN nodes 302. Such a method is described in step 530*b* of Embodiment 1.

Step 624*a*: the NEF 314 sends the DL MB Data to the (R)AN 302 via the UPF 304. An alternative solution for steps 624*a* is that the NEF 314 first sends the packets to the UPF 304. The UPF 304 may store all the packets. The UPF 304 may forward packets to the (R)AN nodes 302 immediately or after receiving all packets from the NEF 314.

Step 624*b*: Following successful receipt of the DL MB Data from the NEF 314, the (R)AN 302 sends a confirmation message to the NEF 314 via UPF 304. An alternative solution is that the (R)AN 302 sends confirmation message to the UPF 304.

Step 626*a*: The (R)AN node 302 is configured with a data buffer to perform transmission and retransmission to EDs 102 using any suitable methods, for example:

Special subframes (like MBSFN) for broadcast transmission from gNB to ED

Single-Cell Point-to-Multipoint (SC-PTM) transmission channel

Unicast data channel (Data Radio Bearer—DRB)

gNB pages the ED 102 to access a DL DRB for MB data.

Step 626*b*: ED 102 reports missing packets (or the missing air interface physical layer RLC PDU, or PDCP PDU) to the (R)AN node 302. No retransmission may be performed until all the packets are sent to DL data channel. However, the EDs may request for retransmission of missing or erroneous packets during the time the (R)AN nodes transmit packets or data file to the EDs by an uplink access stratum signaling channel.

Step 626*c*: when the (R)AN node 302 receives a report of missing packets from a particular ED 102, the (R)AN node 302 may provide a use any of the methods in step 626*a* to retransmit of the missing data Step 626*d*: When ED 102 may determine successful reception of all MB packets by comparing the received data volume and the data volume in the Broadcast Session Information, or by checking sequence number of physical layer data packet in RLC or PDCP layer and the end of data marker. The ED 102 reports the successful reception to the (R)AN node 302.

Step 628: When all of the DL MB Data has been sent from the NEF 314 to the (R)AN node 302, the NEF 314 may send a MB Session Complete message to the SMF 310. This message is the response message for step 622.

Alternatively, the UPF 304 may send a MB Session Complete notification message to the SMF 310.

Step 630*a*: The (R)AN node 302 sends a MB Session Complete Notification message to the SMF 310. This message may include a list of EDs 102 which did not confirm successful reception of the DL MB Data or the list of EDs 102 which successfully receive DL MB Data.

Step 630*b*: Following receipt of the MB Session Complete Notification message from the (R)AN node 302, the SMF 310 may send an acknowledgement message to the (R)AN node 302. The message may contain an instruction to for the (R)AN node 302 to keep or delete the stored MB Session Context information.

Referring now to FIG. 6C:

Step 632*a*: The SMF 310 sends a MB Session Complete message to the UPF 304. The message may contain an instruction to for the UPF to keep or delete (R)AN information, or delete any stored MB Session Context information.

Step 632*b*: Following receipt of the MB Session Complete message from the SMF 310, the UPF 304 may send an acknowledgement message to the SMF 310. The UPF 304 may delete stored MB Session Context information according to the instruction from the SMF 310 in step 632*a*.

Step 634*a*: The SMF 310 sends a MB Session Complete message to the NEF 314. This message may include the list of EDs 102 which did not confirm reception of the DL MB Data. The message may contain an instruction to for the UPF to keep or delete any stored MB Session Context information.

Step 634*b*: Following receipt of the MB Session Release Request message from the SMF 310, the NEF 314 may send a MB Session Complete Acknowledgment message to the SMF 310. The NEF 314 may delete stored MB Session context information as instructed by the SMF 634*b*.

Step 636*a*: The NEF 314 sends a MB Session Complete Notification message to the AF 322. This message may include the list of EDs 102 which did not confirm successful receipt of the DL MB Data.

Step 636*b*: Following receipt of the MB Session Complete Notification message from the NEF 314, the AF 322 sends a MB Session Complete Notification Acknowledgment message to the NEF 314.

It is noted that the above procedure includes steps to establish UP between AS and (R)AN nodes for MB Session from AS to (R)AN. If the MB Session is kept for long time, the (R)AN, UPF and NEF will keep the MB Session Context. When the AS sends a new packet, the packet will be sent to multiple (R)AN node without being buffered in NEF and UPF. However, the NEF, UPF and (R)AN still provide mechanism for acknowledgment for individual packets. This implementation also allows the possibility that the AS 402 may not need to send MB data before the start time of MB session. The AS 402 may sends MB data towards mobile network any time after the user plane connection in the mobile network for the MB session is established.

It is also noted that the above procedure can be used to establish an MB Session before any EDs of the ED Group register with the network. In this case, there will be no data transmission between the AS and EDs. Only the steps to establish the UP of the MB Session are required.

It is also noted that in Embodiment 2, the NEF forwards data to the EDs 102 via UPF. The UPF does not provide a buffer for packets sent from NEF.

Alternatively, the UPF may provide a buffer for packets sent from the NEF. Before the MB Session Start Time, the NEF sends the whole file or packet to the UPF. The UPF stores the data and sends to the RAN at the Start Time.

This embodiment offers the same advantages as Embodiment 1. The difference is that the Application Server 402 sends the DL MB Data via the NEF 314 in Embodiment 2, as opposed to the UPF 304 as in Embodiment 1.

In Embodiments 1 and 2, the AF 322 requests a MB Session and starts sending data immediately or at a scheduled time. In the following embodiment (Embodiment 3), the AF 322 or a Network Management Function (NMF) 702 may request the SMF 310 in the CN 300 to establish a MB Session and send data after establishing MB Session. As may be appreciated, the methods of this embodiment may be combined with methods of embodiments 1 and 2 described above, to enable the establishment of a MB session involving a defined group of EDs or any EDs, which may be used at some later time to send DL MB Data to the EDs participating in the MB Session or any EDs in the geographical areas having MB or broadcast radio signals.

Figure 7A:
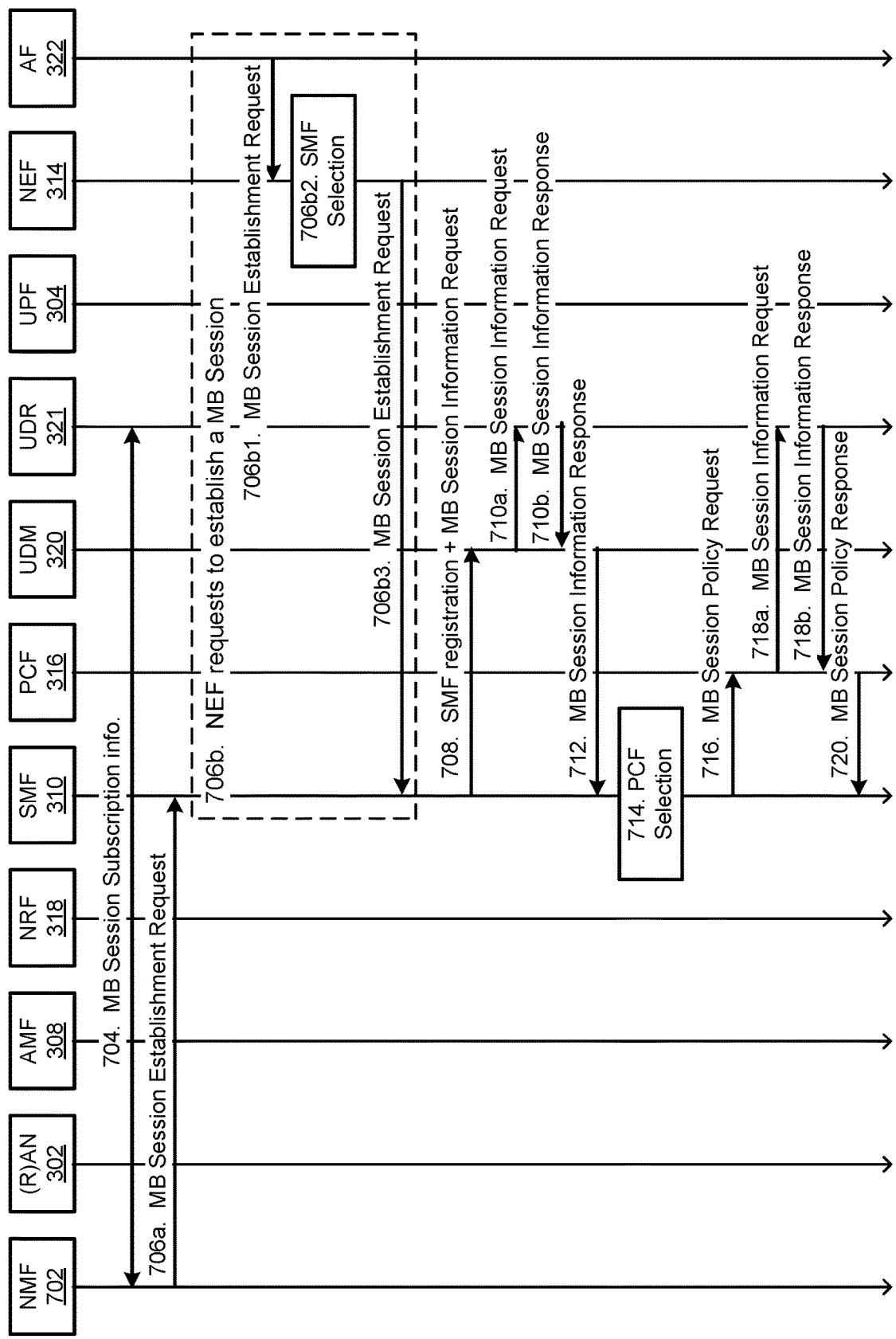
FIGS. 7A and 7B are a message flow diagram illustrating MB Session Establishment in accordance with a representative embodiment of the present invention.
Figure 7B:
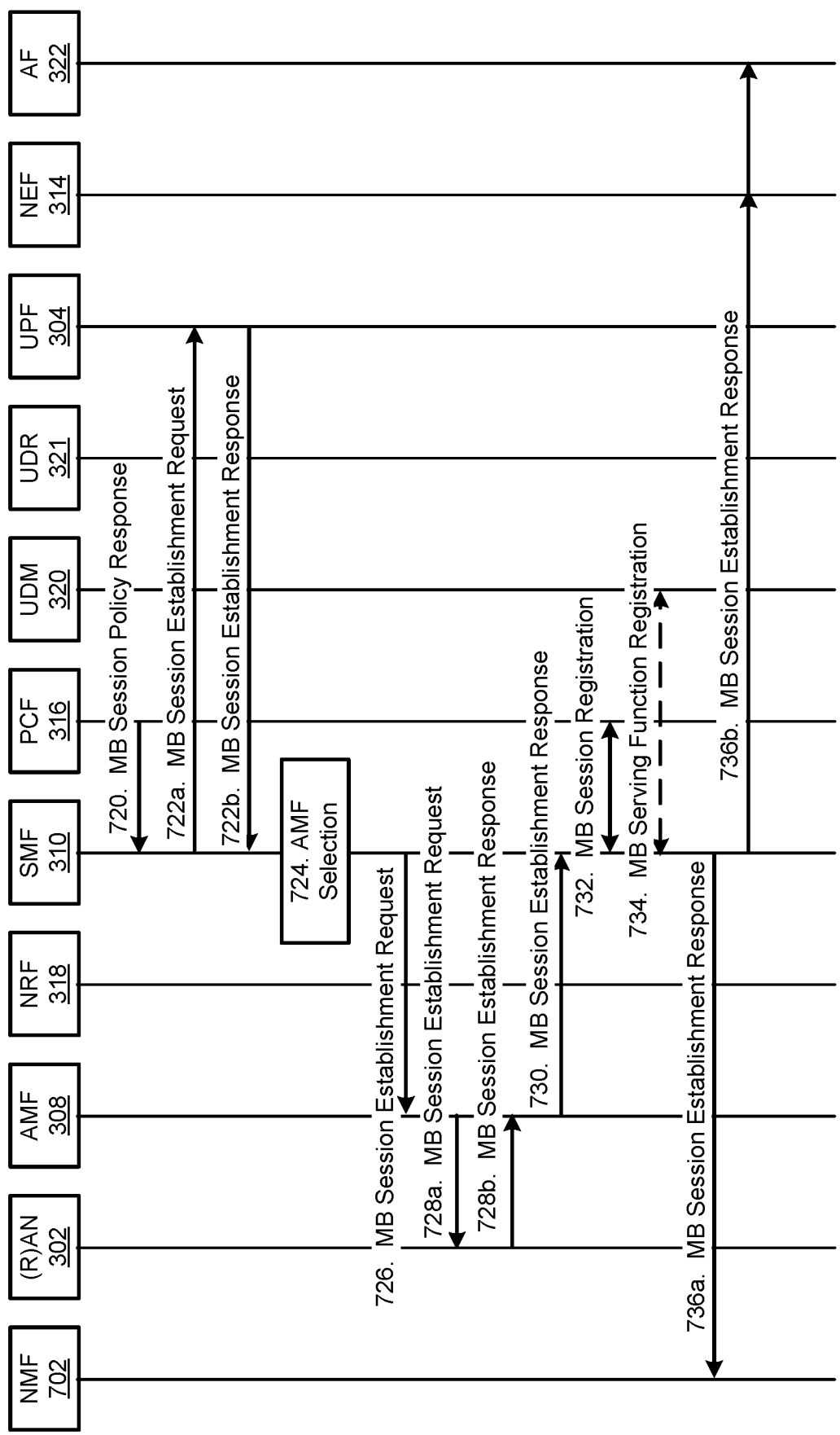

FIGS. 7A and 7B are a message flow diagram illustrating MB Session Establishment. The Network Management Function (NMF) 702 provides operation, administration, and management (OAM) functionalities for the mobile network. Referring to FIG. 7A:

Step 704: The Network Management Function (NMF) 702 configures the UDR 321 with MB Session information. The MB Session information may include one or more of the following:

Application information: to identify the Application that may use the MB (MB) session, e.g. IoT application, V2X application, video application; AS information (e.g. AS IP Address(es) or IP Prefix(es), UDP or TCP port number)

AF-Service-Identifier to identify specific Application Function or Application Server that may use the MB service.

UE information: may be ED IDs (such as SUPI, 5G GUTI, GPSI) and ED capability (e.g. bit rate that ED can support)

Location information of MB Session: Which area to provide MB service. Location information may be RAN addresses, Geographical Zone ID(s).

RAT Type: which RAT(s) may join the MB Session, such as 5G NR, or LTE RAT.

Policy control related to application: Type of flow resource (GBR, delay critical GBR, or non-GBR) Maximum flow bit rate, guaranteed flow bit rate, expected or maximum data volume in a period of time, duration, reliability transmission (e.g. guaranteed packet delivery), N6 interface protocol, charging policy.

Mapping between External Group ID and Internal-Group ID (or TMGI) for a ED Group. List of ED IDs in the Internal ED Group.

Step 706: One of the following network functions may request the SMF 310 to establish a MB Session.

Step 706a: The NMF 702 sends a MB Session Establishment Request message to the SMF 310 to establish the MB Session. The request message may include information in step 704, or additional information, for example the MB Session ID, an internal ED Group ID (e.g. Internal-Group ID, or TMGI—Temporary Mobile Group Identifier), network function information (e.g. AMF Address, PCF Address, NEF Address, Address(es) of UPF(s) to be the Anchor MB Session), location information of MB Session (e.g. (R)AN Addresses, Geographical Zone ID(s)), etc.

Step 706b: The NEF 314 sends a MB Session Establishment Request message to the SMF 310 to establish the MB Session.

Step 706b1: The AF 322 sends a MB Session Establishment Request message to the NEF 314. The request message may include session information including: External Group ID, or list of ED IDs, location information of MB Session (e.g. Geographical Zone ID), QoS requirements (Maximum data rate, average data rate, packet delay budget, expected or maximum data volume in a certain period of time), Network Slice Information (e.g. S-NSSAI), Application ID, how the MB data will be sent to the network (via NEF control plane or UPF user plane), Information of AS 322 (e.g. IP Addresses or IP Prefixes, UDP or TCP port number, packet flow description (PFD)) for example.

Step 706b2: The NEF 314 may perform SMF selection by any one or more of the following methods: (1) pre-configured SMF information; (2) request NRF function to get SMF information (the NEF may send Network Slice Information, Internal Group ID to the NRF for the SMF selection. The NRF returns the SMF Address information); (3) Request UDM 320 or UDR 321 to get the MB Session binding information, which provide a mapping between AF-Service-Identifier ID (or External Group ID) and SMF ID;

Step 706b3: The NEF 314 may forward the MB Session Establishment Request message to the selected SMF 310, which include the information received form the AF 322. In case the MB data will be sent to the NEF 314, the NEF may include an uplink TEID for the UPF 304 to send the message to the NEF 314 for acknowledgement of successfully received data or request for retransmission of missing packets.

Step 708: Following receipt of the MB Session Establishment Request message (according to any of steps 706a-706b3, above) the SMF 310 sends a MB Session Information Request message to the UDM 320. The request message may include some or all of the session information contained in the received MB Session Establishment Request message.

The SMF 310 may also register itself to the UDM 320 as a serving SMF function for the MB Session.

Step 710a: Following receipt of the MB Session Information Request message from the SMF 310, the UDM 320 may send an MB Session information request message to the UDR 321. This message may include the AF-Service-Identifier ID, and External Group ID. If the UDM 320 has the mapping between External Group ID and ED Group ID (e.g. Internal-Group ID), the UDM 320 may also include the Internal-Group ID. The UDM 320 may create a TMGI and also sends this information to the UDR.

Step 710b: Following receipt of the MB Session information request message from the UDM 320, the UDR 321 sends a MB Session information response message to the UDM 320. This response message may include ED Group ID (e.g. Internal-Group ID), list of ED IDs of EDs in the ED Group, Location Information of MB Session (e.g. Addresses of RAN nodes, Geographical Zone ID(s)), and Network Function information if available (e.g. serving AMF, UPF Address(es), NEF Address).

Step 712: Following receipt of the MB Session information response message from the UDR 321, the UDM 320 sends a MB Session Information Response to the SMF 310, which includes information received from the UDR 321 in step 710b. The UDM 320 may also send to the SMF 310 the Internal-Group ID or the TMGI, list of ED IDs, Subscription information related to ED Group (e.g. Maximum bit rate of MB Session, Maximum traffic volume in a certain period), Network Slice Information (e.g. S-NSSAI). Note that if the UDM 320 has the information such as Location information of MB Session, the UDM 320 may skip step 710a.

Step 714: Following receipt of the MB Session Information Response message from the UDM 320, the SMF 310 selects a PCF 316 according to any suitable criteria for example given in 3GPP TS 23.501. The additional information to select PCF may be AF-Service-Identifier, which is to identify AF 320 and/or AS 322.

Step 716: The SMF may have local PCC rules for the MB Session. Otherwise, the SMF 310 may send a MB Session Policy Request message to the selected PCF 316. This message may include an ED Group ID (e.g. Internal-Group ID, TMGI), AF-Service-Identifier, Network Slice Information (e.g. S-NSSAI).

Step 718a: In order to make policy decision, the PCF 316 may send a MB Session Information Request to the UDR 321. This message may include an Internal-Group ID, AF-Service-Identifier received in Step 716. If the PCF 316 already have enough information to make policy decision, step 718a is skipped.

Step 718b: Following receipt of the MB Session Information Request from the PCF 316, the UDR 321 may send a MB Session Information Response to the PCF 316. The message may contain information on MB Subscription information, such as: QoS requirements (resource type (e.g. GBR, delay critical GBR, or non-GBR), maximum flow data rate, guaranteed data rate, packet delay budget, expected or maximum MB traffic volume in certain period of time), charging information, and Access Type (e.g. 5G RAT or 4G RAT), ED subscription information (Service Level Agreement, QoS policy, charging policy, traffic routing policy (Access type(s)), for example.

Step 720: Following receipt of the MB Session Information Response from the UDR 321, the PCF 316 sends a MB Session Policy Response message to the SMF 310. This message may include Policy and Charging Control rules for the MB Session such as QoS policy and charging policy information, for example.

In step 716, the SMF 310 may also send MB Session Policy request to the UDM 320 to get some information such as subscribed QoS parameters of MB Session, such as 5QI, ARP, maximum MB flow bit rate, expected or maximum MB traffic volume in a certain period of time. The maximum MB flow bit rate is the limit of averaged bit rate measured over an averaging window that the Application Server may send to the Core Network via UPF 304 or NEF 314. The UDM 320 may request the MB Session Information stored in the UDR 321 and sends back to the SMF 310.

Referring now to FIG. 7B:

Step 722a: Following receipt of the MB Session Policy Response message from the PCF 316 (or from UDM 320), the SMF 310 sends a MB Session Establishment Request message to the UPF 304. This message may include any part or all of the following information:

MB UP Information: RAN information (IP Addresses of RAN nodes and UL TE ID), DL Tunnel Endpoint ID (TED) if the SMF assigns the DL TED, error correction protocol for the UP tunnel connection between (R)AN node 302 and UPF 304 or between the (R)AN node 302 and the NEF 314 that RAN may use;

N6 Tunnel information: IP Address or IP Prefix and Port number that UPF may use to communicate with Application Server, packet flow description, transport protocol between UPF and AS in case the AS 402 sends the downlink MB packets or files to the UPF 304;

UP information for connection between the UPF 304 and the NEF 314 in case the AF 322 sends DL MB packets or files to the NEF 314;

QoS policy: Resource Type, Maximum flow bit rate, guaranteed flow bit rate, packet delay budget, expected or maximum MB traffic volume in a certain period of time; and Charging policy Step 722b: Following receipt of the MB Session Establishment Request message from the SMF 310, the UPF 304 sends an MB Session Establishment Response to the SMF 310. The message may include the UL TEID for the (R)AN 302 to send acknowledgement message for successful packets or file receipt or request the UPF 304 or NEF 314 to retransmit missing packets.

Step 724: Following receipt of the MB Session Establishment Response message from the UPF 304, the SMF 310 may select an AMF 308 to send SM messages to RAN nodes 302 by one of the following methods: (1) AMF information is pre-configured in the SMF 310; (2) the SMF 310 may obtain the AMF information from UDM 320 in step 712; (3) The SMF 310 may request the NRF 318 to get the AMF address. In method (3), the SMF 310 may provide NRF 318 with application information (e.g. AF-Service-Identifier), Network Slice Information (e.g. S-NSSAI), Geographical location of MB service (e.g. Geographical Zone ID(s), or (R)AN Addresses), for NRF 318 to select an AMF 308. It is noted that a similar step can also be included in the other embodiments.

Step 726: Following selection of the AMF 308, the SMF 310 sends an N11 message and MB Session Establishment Request message to the AMF 308. The N11 message may include any one or more of:

SMF ID;

Network Slice Information (such as S-NSSAI);

MB Session ID; and

RAN information, such as Geographical Zone ID(s), or list of Addresses of RAN nodes to join the MB Session;

The MB Session Establishment Request message may include any one or more of:

UPF information: UPF Address and UL TEID. The UL TEID may be used for RAN to request missing packets to be resent by UPF;

UE Information: Internal Group ID, List of ED IDs (such as SUPI, or 5G Globally Unique Temporary Identifier (5G GUTI)), or any EDs in case of broadcast session;

QoS Profile; and

Error Correction protocol in the tunnel connecting (R)AN 302 and UPF 304 to be used by (R)AN 302 to request for missing PDU packets;

Step 728a: Following receipt of the MB Session Establishment Request message from the SMF 310, the AMF 308 may create an N2-AP control channel between the AMF 308 and each (R)AN node 302 that is included in step 726 to exchange control signal for the ED Group ID, and/or for MB Session ID. The AMF 308 forwards the MB Session Establishment Request message to the (R)AN 302. The AMF 308 may request the (R)AN 302 to establish a control channel between the AMF 308 and (R)AN 302 to exchange signaling information between AMF 308 and (R)AN 302.

Step 728b: If it is a Guaranteed Bit Rate (GBR) resource type, the RAN 302 may respond to the MB Session Establishment Request message from the AMF 308 by reserving radio resources for the MB Session according to the QoS Profile.

The (R)AN 302 then sends a MB Session Establishment Response message to the AMF 308. This response message may include DL TEID in case the (R)AN 702 is in charge of assigning DL TEDI.

Step 730: Following receipt of the MB Session Establishment Response message from the (R)AN 302, the AMF 308 forwards the MB Session Establishment Response message to the SMF 310. If the DL TEID is included in the MB Session Establishment Response message received from the (R)AN 302, the SMF 301 sends a MB Session Modification message to the UPF 304 to provide the DL TED.

An alternative method in steps 726, 728a, 728b, and 730, for the SMF 310 to configure SM Session Context in (R)AN 302 is as follows.

Step 726: The SMF 310 sends an N11 MB Session Establishment Request message to the AMF 308. The message may contain similar information that described in step 726 early, for example the list of (R)AN Addresses, QoS information, UPF information (e.g. Address of UPF, and UL TEID for each (R)AN node), DL TEID of MB Session, ED Group ID (e.g. Internal-Group ID, or TMGI), MB Session ID, Network Slice Information (e.g. S-NSSAI).

Step 728a: The AMF 308 may create an N2-AP control channel between AMF 308 and each (R)AN node 302 that is included in step 726 to exchange control signal for the ED Group ID, and/or for MB Session ID. The AMF 308 creates multiple N2 MM MB Session Establishment Request for each (R)AN node 302. The message may include the information received in Step 726.

Step 728b: If it is a Guaranteed Bit Rate (GBR) resource type, the RAN 302 may respond to the MB Session Establishment Request message from the AMF 308 by reserving radio resources for the MB Session according to the QoS Profile.

Step 730: Each of (R)AN nodes 302 then sends an N2 MM MB Session Establishment Response message to the AMF 308. This response message may include DL TEID in case the (R)AN 702 is in charge of assigning DL TEDI.

The AMF 308 collects all the N2 MM MB Session Establishment Response message, and forward MB Session information received in step 728b to the SMF 310.

Step 732: Following receipt of the MB Session Establishment Response message from the AMF 308, the SMF 310 may initiate a MB Session registration process with the PCF 316 to activate a mapping between MB Session ID and ED Group ID (e.g. Internal Group ID, TMGI), or the mapping between the IP Address/Prefix that was assigned in Step 722a for the AMS UPF 304. This link is used for the PCF 316 to update dynamic policy control for SMF 310 to control the MB Session policies.

Step 734: The SMF 310 may also initiate a registration process with the UDM 320 to register itself as a serving SMF function for the MB Session ID, if this step was not done in Step 708.

Step 736: The SMF 310 may then send MB Session Establishment Response messages to the network function that initiated MB Session Establishment Request in Step 706 to confirm the completion of MB Session establishment process. In case the NEF 324 initiates the request and the AF will send data to the NEF 314, the SMF may include AMS UPF information, such as UPF Address(es) and DL TED for the NEF to send DL packets to the UPF(s).

Figure 8A:
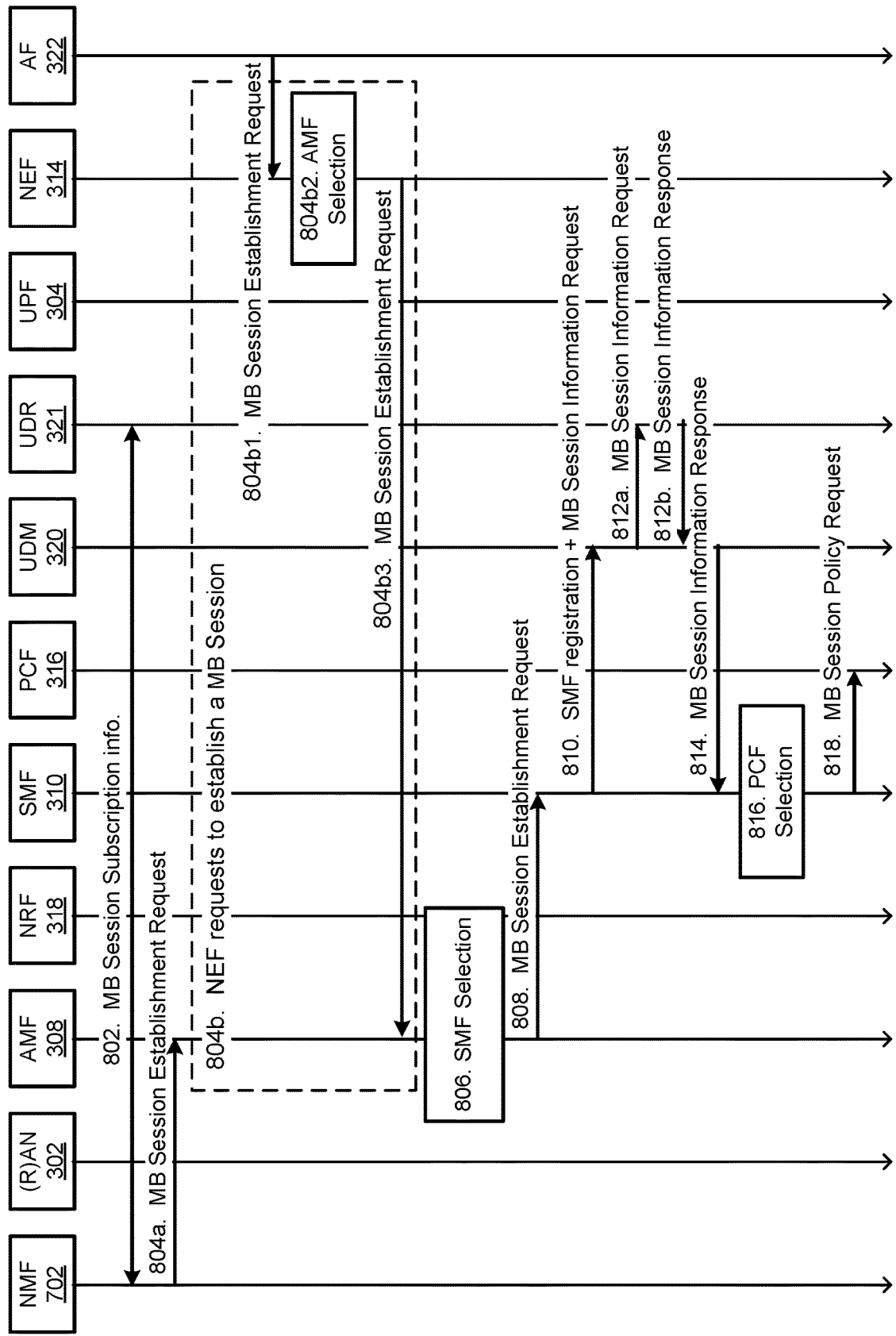
FIGS. 8A and 8B are a message flow diagram illustrating MB Session Establishment in accordance with another representative embodiment of the present invention.
Figure 8B:
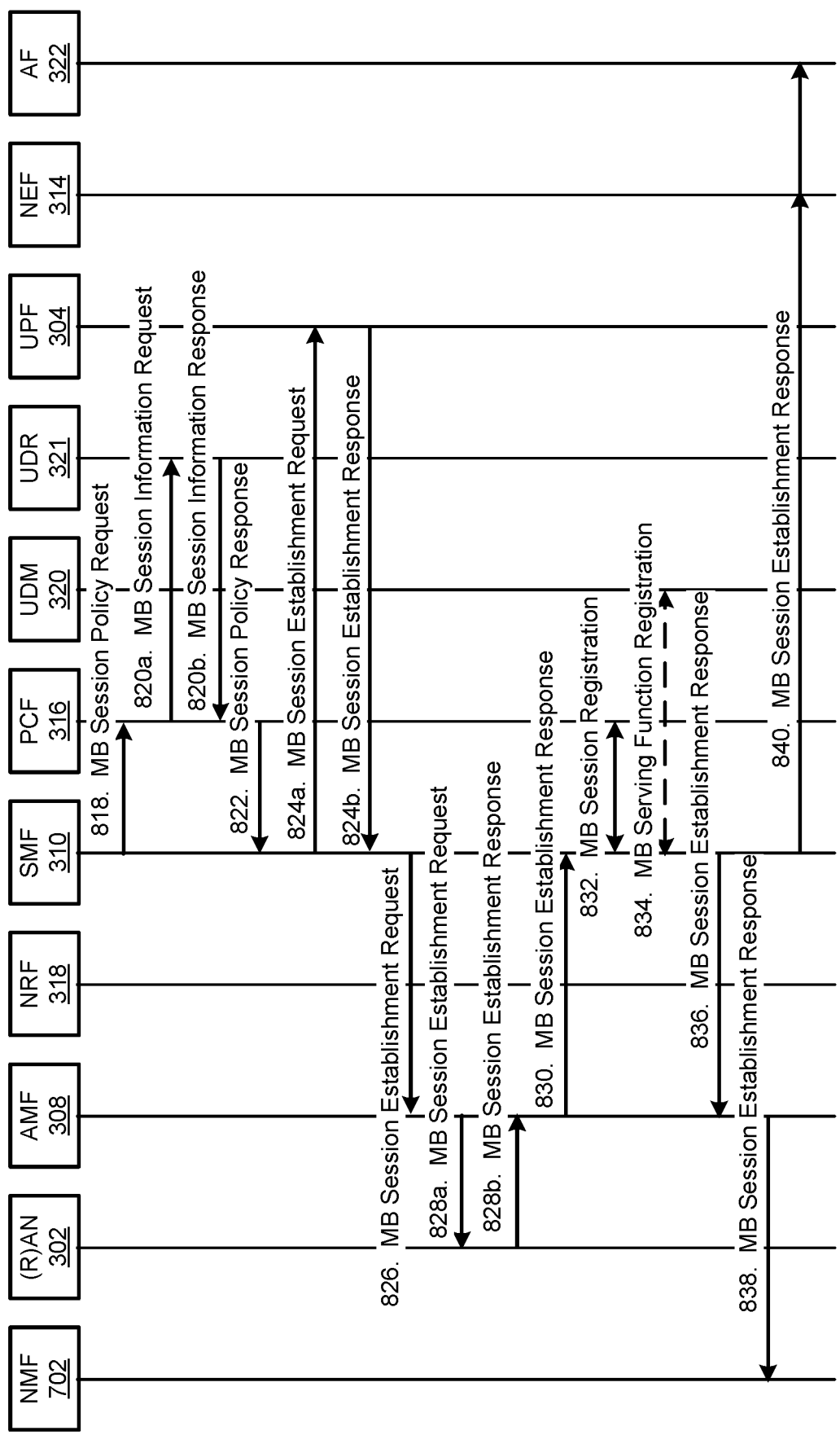

In Embodiments 1 and 2, the AF 322 requests a MB Session and starts sending data immediately. In the following embodiment (Embodiment 4), the AF 322 or Network Management Function 702 may request the AMF 308 to establish a MB Session and send data later. As may be appreciated, the methods of this embodiment may be combined with methods of embodiments 1 and 2 described above, to enable the establishment of a MB Session involving a defined group of EDs, which may be used at some later time to send DL MB (MB) Data to the EDs participating in the MB Session FIGS. 8A and 8B are a message flow diagram illustrating MB Session Establishment by the AMF. Referring to FIG. 8A:

Step 802: This step is similar to step 704 of Embodiment 3. The Network Management Function (NMF) 702 configures the UDR 321 with MB Session subscription information. The MB Session subscription information may include:

Application information: to identify the Application that may use the MB (MB) session, e.g. IoT application, V2X application, video application.

AF information(s): to identify specific Application Function or Application Server that may use the MB service, e.g. AF-Service-Identifier, DNAI, AF and or AS information (e.g. IP Address(es) or IP Prefix(es), UDP or TCP port number), Packet Flow Description to be sent from AS or AF.

UE information: ED Group ID (e.g. Internal-Group ID, or TMGI), List of ED IDs and ED capability (e.g. bit rate that the ED can support)

Location information: Which area to provide MB service. Location information may be represented by RAN addresses, or geographical area.

Mapping of Geographical Zone Identifier and Location Information. The Geographical Zone Identifier may be provided by the AF 322.

RAT Type: which RAT(s) may join the MB Session.

Policy and charging control (PCC) rules: Type of flow resource (GBR, delay critical GBR, or non-GBR) Maximum flow bit rate, guaranteed flow bit rate, duration, reliability transmission (e.g. guaranteed packet delivery), N6 interface protocol, charging policy.

Mapping between External Group ID and Internal Group ID for a ED Group. List of ED IDs in the Internal Group.

Step 804: One of the following network function may request AMF to establish a MB Session.

Step 804a: The NMF 702 sends a MB Session Establishment Request message to the AMF 308 to establish the MB Session. The request message may include the MB Session ID, an internal Group ID (e.g. TMGI—Temporary Mobile Group Identifier), network function information (e.g. SMF Address that serves the MB Session, PCF Address, UPF Address to be the gateway, NEF Address that is the interface with the AF 322), location information of MB Session (e.g. RAN Addresses, Geographical Zone ID(s)), ED information (list of ED IDs), Network Slice Information (S-NSSAI), etc.

Step 804b: The NEF 314 may send a MB Session Establishment Request message to the AMF 308 to establish the MB Session. The NEF 314 may create an MB Session Context locally to store all the MB Session information known by NEF 314.

Step 804b1: The AF 322 sends MB Session Establishment Request to the NEF 314. The request message may include session information including: Network Slice Information (S-NSSAI), External Group ID, or list of ED IDs (e.g. External Identifier, GPSI), location information of MB Session (e.g. Geographical Zone Identifiers (ID) and other information as described in step 802 for AF information), Information on Core network interface to receive MB data (via control plane NEF or user plane UPF) QoS requirements (Maximum data rate, average data rate, packet delay budget, expected and/or maximum data volume in a certain period), and AF information (e.g. AF-Service-Identifier, and other information as described in step 802 for AF information), for example.

Step 804b2: The NEF 314 may perform AMF selection by any one or more of the following methods: (1) pre-configured AMF information; (2) request NRF function to get AMF information; (3) Request UDM 320 or UDR 321 to get the MB Session binding information, which provides a mapping between AF Information (e.g. AF-Service-Identifier) or External ED Group ID and AMF ID. The NEF 314 may have a locally stored mapping between External Group ID and Internal-Group ID (or TMGI, or IMSI-Group Identifier). The NEF may also request UDM 320 or UDR 321 to get the mapping between External Group ID and Internal ED Group ID (e.g. Internal-Group Identifier, IMSI-Group Identifier). The NEF may store locally the mapping between Geographical Zone ID and (R)AN Addresses. The NEF may also access the UDR to get the mapping between Geographical Zone ID and (R)AN Addresses. In some embodiments, the NEF 314 may request the NRF 318 to discover an AMF. In such an embodiment, the NEF may provide to the NRF the AF information, Geographical Zone ID or (R)AN Addresses, Internal ED Group ID, External Group ID, Network Slice Information (S-NSSAI) in order for the NRF 318 to select an AMF.

Step 804b3: The NEF 314 forwards the MB Session Establishment Request message to the selected AMF 308. This message may include the NEF Address and UL TEID of the tunnel between the UPF 304 and NEF 314 in case the NEF is used to receive the DL data from the AF 322. The message may include the External Group ID, or Internal ED Group ID.

Step 806: The AMF 308 may create an MB Session Context locally to store all the MB Session information known by AMF 308. If the NEF sends the External Group ID, the AMF 308 may send the External Group ID to the UDM 320. The UDM 320 then sends to the AMF 308 to provide the Internal ED Group (e.g. Internal-Group ID, IMSI-Group ID, or TMGI). The AMF 308 performs SMF selection by any one or more of the following methods: (1) pre-configured SMF information; (2) requesting NRF to provide SMF Address as described in TS 23.501; (3) requesting UDM to obtain SMF Address.

In a case in which the AMF 308 sends a request to the NRF 318 to provide SMF information, the AMF 308 may send Network Slice Information (S-NSSAI), Internal ED Group ID (e.g. Internal-Group ID, IMSI-Group ID), AF information, Geographical Zone Identifier (ID), and (R)AN Address(es), for SMF selection. Accordingly, box 806 is shown to include both the AMF 308 and the NRF 318, to indicate that messaging can flow between the AMF 308 and the NRF 318 such that the AMF 308 can discover available SMFs select the SMF 310.

The NRF 318 may inform the AMF 308 the list of SMF(s) 310, each SMF may serve a certain area, which corresponds to the list of (R)AN nodes 302, or corresponding to the Geographical Zone ID(s).

The AMF 308 may send a message to the UDM 320 to register itself as Serving AMF for the Internal ED Group.

Step 808: The AMF 308 sends an N11 MB Session Establishment Request message to each of selected SMF(s) 310. This message may contain information received by the AMF 308 in Step 804, such as Internal ED Group ID (e.g. Internal-Group ID, IMSI-Group ID, TMGI), AF information, (R)AN Addresses, the NEF Address and UL TED of the NEF 314 for the AMS UPF 304 to send UL message to the NEF 314 in case the NEF 314 is used to receive the DL data from the AF 322.

The AMF 308 may use the locally stored mapping between the Geographical Zone ID and (R)AN Addresses to identify the (R)AN Addresses. Alternatively, the AMF 308 may use the list of ED IDs to identify the current serving (R)AN Addresses. The AMF 308 may send a request with the Internal ED Group ID to the UDM 320 to get the list of ED IDs (e.g. SUPI). The UDM 320 then sends to the AMF 308 the list of ED IDs.

Step 810: Following receipt of the N11 MB Session Establishment Request message from the AMF 308, the SMF 310 may create an MB Session Context locally to store all the MB Session information known by SMF 310. The SMF 310 sends a MB Session Information Request message to the UDM 320. The request message may include some or all of the session information contained in the received MB Session Establishment Request message, for example Internal ED Group ID and/or the List of ED IDs.

The SMF 310 may also register itself to the UDM 320 as a serving SMF function for the MB Session.

Step 812a: Following receipt of the MB Session Information Request message from the SMF 310, if the UDM does not have ED subscription information (such as service level agreement, maximum data rate, default 5QI), the UDM 320 may send a MB Session information request message to the UDR 321. This message may include the Application ID (such as AF-Service-Identifier), and/or External Group ID. If the UDM 320 has the mapping between External ED Group ID and Internal ED Group ID, the UDM 320 may also include the Internal Group ID, Location information of MB Session (e.g. the Geographical Zone ID(s) and/or the list of Addresses of (R)AN nodes).

Step 812b: Following receipt of the MB Session information request message from the UDM 320, the UDR 321 may send a MB Session information response message to the UDM 320. This response message may include Internal ED Group ID, list of ED IDs or any ED in the Internal ED Group, Location Information of MB Session (e.g. Addresses of RAN nodes), DNAI, and Network Function information if available (e.g. serving AMF, UPF Address(es), NEF Address).

Step 814: Following receipt of the MB Session information response message from the UDR 321, the UDM 320 may store the received information from the UDR 321. The UDM 320 may send a MB Session Information Response to the SMF 310, which includes information received from the UDR 321 in step 812b.

Step 816: The SMF 310 may select a PCF 316 according to any suitable criteria described in TS 23.501 Version 1.3.0, published in November 2017. The SMF may use additional information, including DNAI, UPF Addresses, NEF Address to select the PCF. Note that the SMF 310 may select UPF, including AMS UPF(s) and intermediate UPF before selecting PCF 316 and if the UPF information is not provided by the UDM 320 in step 814. The intermediate UPF(s) is (are)

used to connect the AMS UPF(s) to the (R)AN nodes if the selected AMF UPF 304 does not have a direct connection to some (R)AN nodes.

Step 818: The SMF 310 sends a MB Session Policy Request message to the selected PCF 316. This message may include an Internal ED Group ID (e.g. Internal-Group ID, IMSI-Group Identifier, TMGI (Temporary Mobile Group Identifier)), AF information (such as AF-Service-Identifier), MB Session ID.

Referring now to FIG. 8B:

Step 820*a*: If the PCF 316 does not have PCC rules for the ED Group and application, the PCF 316 sends a MB Session Information Request to the UDR 321. This message may include an Internal ED Group ID (such as Internal-Group ID, or IMSI-Group ID) and AF information (e.g. AF-Service-Identifier) received in Step 716.

Step 820*b*: Following receipt of the MB Session Information Request from the PCF 316, the UDR 321 sends a MB Session Information Response to the PCF 316. The message may contain information on MB Subscription information, such as: QoS requirements of the ED or Internal ED Group (resource type (GBR, delay critical GBR, non-GBR), maximum flow data rate, guaranteed data rate, packet delay budget, expected or maximum MB data volume in certain period of times), charging information, and Access Type (e.g. 5G RAT or 4G RAT), DNAI, for example.

Step 822: Following receipt of the MB Session Information Response from the UDR 321, the PCF 316 may make PCC rules and may send a MB Session Policy Response message to the SMF 310. This message may include PCC rules, such as QoS policy (maximum session data rate, 5QI), DNAI, and charging policy information.

Step 824*a*: Following receipt of the MB Session Policy Response message from the PCF 316, the SMF 310 may select one or multiple UPF according to the method describe in TS 23.501. The SMF may use additional information to select the UPF(s) 304 such as NEF Address. The SMF may sends a MB Session Establishment Request message to the selected UPF(s) 304. This message may include any part or all of the following information:

MB Session Tunnel Information: RAN information (IP Addresses of RAN nodes), DL Tunnel Endpoint ID (TED) if the SMF assigns the DL TEID for the UPF to send DL packet to the (R)AN nodes, error correction protocol that RAN may use. In case the SMF 310 assigns the UL TEID, the message may include UL TEID for each of the (R)AN 302 to send UL packet or UL message to the UPF 304 (for acknowledgment of successful receipt of packet or file, or request for retransmission of missing or erroneous packets). Each (R)AN 302 may be assign a different UL TEID;

N6 Tunnel information: IP Address or IP Prefix and Port number that UPF may use to communicate with Application Server, transport protocol between UPF and AS.

Tunnel information (NEF Address, DL TEID and UL TEID) that the UPF 304 may use to connect with the NEF 314;

QoS policy: 5QI, or specific Resource Type, Maximum MB service or flow bit rate, guaranteed MB Session or flow bit rate, maximum or guaranteed MB traffic volume in certain periods of times, packet delay budget, Packet Flow Description (PFD) for traffic detection; and Charging policy.

Step 824*b*: Following receipt of the MB Session Establishment Request message from the SMF 310, the UPF 304 sends a MB Session Establishment Response to the SMF 310. In case the UPF 304 assigns UL TEID, the message may include UL TEID for the (R)AN 302 to send UL packet or UL message to the UPF 304 (for acknowledgment of successful receipt of packet or file, or request for retransmission of missing or erroneous packets). Each (R)AN 302 may be assigned a different UL TEID.

Step 826: Following receipt of the MB Session Establishment Response message from the UPF 304, the SMF 310 sends an N2 SM message and N11 MB Session Establishment Request message to the AMF 308. The N11 MB Session Establishment Request message may include any one or more of:

SMF ID;

MB Session ID; and

RAN information, such as Address of RAN nodes to join the MB Session.

For each (R)AN node 302, the N2 SM MB Session Establishment Request message may include any one or more of:

UPF information: UPF Address and UL TEID. The UL TEID may be used for (R)AN 302 to send UL messes to the UPF 304, for example to request missing packets to be resent by UPF, or to acknowledge the successful receipt of DL packets or a complete file;

UE Information: List of EDs, or any EDs;

QoS Profile; and

Error Correction protocol to be used by RAN to request for missing PDU packets.

Step 828*a*: Following receipt of the N2 SM MB Session Establishment Request message from the SMF 310, the AMF 308 forwards the N2 SM MB Session Establishment Request message to the (R)AN 302. The AMF 308 may request the (R)AN 302 to establish an N2-AP control channel between the AMF 308 and (R)AN 302 to exchange signaling information between AMF 308 and (R)AN 302 for specific Internal ED Group ID (e.g. Internal-Group ID, IMSI-Group ID, TMGI). This tunnel may be also identified by the Internal-Group ID and MB Session ID. It could be similar to N2 interface for a single ED 102.

Step 828*b*: If it is a Guaranteed Bit Rate (GBR) resource type, the RAN 302 may respond to the MB Session Establishment Request message from the AMF 308 by reserving radio resources for the MB Session according to the QoS Profile.

The (R)AN 302 then sends a N2 SM MB Session Establishment Response message to the AMF 308. This response message may include DL TEID if the (R)AN is in charge of assign DL TEID for MB Session.

Step 830: Following receipt of the MB Session Establishment Response message from the (R)AN 302, the AMF 308 forwards the N2 SM MB Session Establishment Response message to the SMF 310. If the DL TED is included in the MB Session Establishment Response message received from the (R)AN 302, the SMF 310 sends a MB Session Modification message to the UPF 304 to provide the DL TEID.

An alternative method for step 826, 828*a*, 828*b*, and 830 is provided as follows.

Step 826: Following receipt of the MB Session Establishment Response message from the UPF 304, the SMF 310 sends an N11 MB Session Establishment Request message to the AMF 308. The N11 MB Session Establishment Request message may include any one or more of:
SMF ID;
MB Session ID; and
MB location information, such as Geographical Zone ID(s) or Address(es) of RAN nodes to join the MB Session.

For each or multiple (R)AN nodes 302, the SMF 310 may include any one or more of:
UPF information: UPF Address and UL TEID. The UL TEID may be used for (R)AN 302 to send UL messes to the UPF 304, for example to request missing packets to be resent by UPF, or to acknowledge the successful receipt of DL packets or a complete file;
UE Information: List of EDs, or any EDs;
QoS Profile; and
Error Correction protocol to be used by RAN to request for missing PDU packets;

Step 828a: Following receipt of the N11 MB Session Establishment Request message from the SMF 310, the AMF 308 creates multiple N2 MM MB Session Establishment Request message to each of the (R)AN node 302. The AMF 308 may request each (R)AN node 302 to establish an N2-AP control channel between the AMF 308 and (R)AN 302 to exchange signaling information between AMF 308 and (R)AN 302 for specific Internal ED Group ID (e.g. Internal-Group ID, IMSI-Group ID, TMGI). This tunnel may be also identified by the Internal-Group ID and MB Session ID. It could be similar to N2 interface for a single ED 102. The N2 MM MB Session Establishment Request may include security information for the ED to access the MB Session and to decrypt the MB Data, and information received from the SMF 310.

Step 828b: If it is a Guaranteed Bit Rate (GBR) resource type, the RAN 302 may respond to the N2 MM MB Session Establishment Request message from the AMF 308 by reserving radio resources for the MB Session according to the QoS Profile.

The (R)AN 302 then sends a N2 MM MB Session Establishment Response message to the AMF 308. This response message may include DL TEID if the (R)AN is in charge of assign DL TEID for MB Session. Each (R)AN node 302 may create an MB Session Context to store locally all information of MB Session known by the (R)AN node 302.

Step 830: Following receipt of the N2 MM MB Session Establishment Response message from the all the (R)AN 302, the AMF 308 forwards the relevant SM for MB Session in the N11 MB Session Establishment Response message to the SMF 310. For example, the N11 MB Session Establishment Response message may include the DL TEID of (R)AN 308 for MB Session. Note that the (R)AN nodes 308 may use the same DL TED or different DL TEID for the MB Session. If the DL TEID is included in the N2 MM MB Session Establishment Response message received from the (R)AN 302, the SMF 310 sends a MB Session Modification message to the UPF 304 to provide the DL TEID.

Step 832: Following receipt of the MB Session Establishment Response message from the AMF 308, the SMF 310 may initiate a MB Session registration process with the PCF 316 to activate a mapping between MB Session ID and Internal ED Group ID (e.g. Internal-Group ID, IMSI-Group ID, TMGI), or the mapping between the IP Address/Prefix that was assigned in Step 722a for the UPF 304. This link is used for the PCF 316 to update dynamic policy control for the MB Session.

Step 834: The SMF 310 may also initiate a registration process with the UDM 320 to register itself as a serving SMF function for the MB Session ID, if this step was not done in Step 806.

The SMF 310 may then send MB Session Establishment Response messages to the network function that initiated MB Session Establishment Request in Step 804 to confirm the completion of MB Session establishment process. Thus:

Step 836: If the NMF 702 has requested the MB Session establishment in Step 804, the SMF 310 sends a MB Session Establishment Response message to the NMF 702 to confirm the completion of MB Session establishment. This message can be sent directly to the NMF 702 or via the AMF 308.

Step 838: the AMF 308 sends the MB Session Establishment Response message to the NMF 702 to confirm the successful establishment of MB Session.

Step 840: If the NEF 314 requested MB Session establishment in Step 804, the SMF 310 sends MB Session Establishment Response message to the AF 322 via the NEF 314. The SMF may send to the NEF the DL TEID that is used for the NEF 314 to send DL packets to the UPF 304 in case the NEF is used to transfer the MB-broadcast data to the EDs.

As mentioned earlier, Embodiments 3 and 4 may be used to establish an MB Session in the communication system before the AS 402 may send MB data to the network. Using some steps describe in Embodiments 1 and 2, the AS 402 or AF 322 may send the MB data to the ED(s) 102. For example, the AS 402 first send the data to the UPF 304 similar to step 516 of Embodiment 1. Then the UPF may send MB data to the (R)AN nodes 302 as described in step 530a and 530b of Embodiment 1. The (R)AN 302 then send data to the EDs 102 as described in step 532a, 532b, 532c, 532d. The MB Session Report may be obtained by following steps 534 to 538b of Embodiment 1.

In the Embodiments 1, 2, 3, 4, the AS 402 may send MB Data to multiple UPF 304. In case the AS 402 sends MB Data to only one UPF 304, namely Anchor MB Session (AMS) UPF, and the selected AMS UPF 304 may not have direct UP connections to some (R)AN nodes 302, the SMF 310 may select some intermediate UPF 304, that can connect (R)AN nodes 302 and the AMS UPF 304.

Based on the foregoing description, it will be seen that embodiments of the present invention may provide any one or more of:
Methods to establish MB Session to deliver packets and data file between an Application Server and a defined group of one or more EDs, or any EDs in a defined geographical location. This may include any one or more of:
Methods in Embodiments 1 and 2. The MB Session Establishment may include the message and/or data to be sent to ED Groups;
Methods in Embodiments 3 and 4. The MB Session is established before the data is sent to the ED Group; and
Combining of Methods in Embodiments 1, 2, 3, 4 to allow MB data to be sent to the ED Group after the MB Session is established.
Methods to notify EDs for scheduled MB Sessions. This may include any one or more of:
End-to-end reliable packet/file delivery methods between ED and Application Function/Application Server:
methods for a (R)AN node to perform retransmission in a MB Session, methods for a (R)AN to report successful packet and file delivery to the SMF;

and methods for the SMF to report successful packet and file delivery to the Application Function/Application Server.

Functionalities of UPF to support MB Session, which may, for example, include:

Data caching functionality to store data sent from Application Server

UP connection for MB Session: Perform multicast transmission to multiple (R)AN nodes.

Generate UL TEID for (R)AN nodes to send messages to the UPF.

Receiving ACK/NACK from RAN nodes and retransmit missing/erroneous packets to RAN nodes.

An interface connection between UPF the NEF for receiving DL packets from the NEF and sending UL message to the NEF for acknowledgement of successful DL packet reception or request the retransmission of missing or erroneous DL packets. This interface could be the same as N9 interface and use GTP-U tunnel protocol, where the field "Message Type" may be used for sending Acknowledgment or retransmission request of missing packets.

Create MB Session Context to locally stored in UPF some or all the information related MB Session known by the UPF.

Perform traffic enforcement for MB Session: for example maximum MB flow bit rate, guaranteed MB flow bit rate, or maximum MB traffic volume, guaranteed MB traffic volume enforcement.

Functionalities of SMF to support MB Session which may, for example, include:

Handle the request form NMF and AF via NEF to establish MB Session

Establish MB Sessions: identifying RAN nodes and assign DL TEID for MB Session; and UL TEID(s) for (R)AN(s) to send UL message to the UPF.

Receiving N2 SM MB Session report from RAN nodes over interface for successful packet or file delivery from RAN to EDs. Receiving List of EDs that successfully received the packets or file or the list of ED that fail to connect to the network and/or fail to receive the packet(s) or file.

Reporting successful file or packet delivery to the EDs, including EDs that do not receive the packet or data file to the AF, either directly or via the NEF.

Message to send MB session information from SMF to ED.

Selection of AMF for establishing connection to the (R)AN nodes.

Create MB Session Context and store it in a storage medium accessible by the SMF. This MB Session Context may contain some or all the information related MB Session known by the SMF. Store MB Session context may include: NEF information (Address, UL TEID and DL TEID for connecting UPF with NEF).

Select UPF(s) to serve MB Session using NEF Address Information. If a (R)AN node can be connected to multiple UPFs, the SMF select a UPF to connect the UPF and the (R)AN node for MB Session.

Functionalities of the ED, which may, for example, include:

During the first transmission of packets of a file or message from (R)AN, the ED receives the physical layer packets (RLC layer and PDCP layer). If any physical layer packets are missing, the ED may request the (R)AN for retransmission using an UL control channel during the MB Session or after the (R)AN informs the ED about end-of-file or end-of-packet.

In the ED, the physical layer may forward individual packets, or all packets that have been correctly received to the application layer.

Create MB Session Context and store it in a storage medium accessible by the ED. This MB Session Context may contain some or all the information related to the MB Session known by the ED.

Functionalities of (R)AN, which may, for example, include:

Buffers the packets received from UPF.

Sends Acknowledge/Negative Ack for the received or missing packets or successful receipt of file to the UPF.

Sends packets in the buffer to the EDs using any combinations of suitable data radio bearer (DRB) such as unicast DRB, point-to-multi point DRB, broadcast DRB, or paging signaling channel, or broadcast signaling channel.

Retransmits the missing packets to the EDs after the first transmission of all packets.

Create MB Session Context and store it in a storage medium accessible by the (R)AN. This MB Session Context may contain some or all the information related MB Session known by the (R)AN.

Perform traffic enforcement for MB Session: for example maximum MB session bit rate, guaranteed MB session or flow bit rate, or maximum MB traffic volume, guaranteed MB traffic volume enforcement.

Functionalities of NEF, which may, for example, include:

Receive MB Session Request from AF.

Buffer data received from NEF.

Transmit file of packets to UPF.

Discover SMF function that may serve the MB Session.

Discover AMF that may serve MB Session

Create MB Session Context and store it in a storage medium accessible by the NEF. This MB Session Context may contain some or all the information related MB Session known by the NEF.

Receive Acknowledge/Negative Ack from the UPF for the received or missing packets or successful receipt of packets or file.

Receive MB Session report message from the SMF and forward to the AF. The report message may consist of a list of EDs that successful received MB-broadcast data, and/or the list of EDs that fail to connect to the network, and/or the list of EDs that fail to receive the complete DL MB Data message.

Functionalities of AMF, which may, for example, include:

Handle the request from NMF, SMF, and NEF to establish MB Session

Create MB Session Context and store it in a storage medium accessible by the AMF. This MB Session Context may contain some or all the information related MB Session known by the AMF.

Establish a control channel, N2-AP between AMF and (R)AN node for sending MB Session control message between the (R)AN and the AMF and SMF. The N2-AP control channel could be represented by a ED Group ID (such as Internal-Group ID, IMSI Group, TMGI).

Select an SMF to serve MB Session.

Store mapping of Geographical Zone ID and (R)AN Address (such as IP Address).

Receive one request from the SMF, e.g. to establish an MB Session in multiple (R)AN nodes, and generate multiple control message to send to multiple (R)AN nodes, e.g. to create MB Session Context in multiple (R)AN nodes.

Functionalities of PCF, which may, for example, include:

Create policy and charging control (PCC) rules for MB Session by using at least any combinations of the following information: Application information (such as AF-Service-Identifier), ED Group ID, ED IDs, (R)AN Address(es), Access Type.

Provide SMF with PCC rules for MB Session for newly established or existing MB Sessions.

Functionalities of UDR, which may, for example, include:

Store ED Group information, including MB data session

Store mapping of Geographical Zone ID and (R)AN Address (such as IP Address).

Create MB Session Context and store it in a storage medium accessible by the PCF. This MB Session Context may contain some or all the information related MB Session known by the PCF.

Functionalities of UDM, which may, for example, include:

Store ED Group information, including MB data session

Store mapping of Geographical Zone ID and (R)AN Address (such as IP Address).

Generate ED Group ID, for example Internal-Group ID or TMGI, for MB Session.

Functionalities of NRF, which may, for example, include:

Provide AMF selection service using ED Group information (ED Group ID, ED ID (e.g. SUPI)), Geographical Zone ID, Location information (e.g. (R)AN Address), DNAI, application information (e.g. AF-Service-Identifier), Network Slice Information (e.g. S-NSSAI), NEF information.

Allow SMF selection using ED Group information (e.g. Internal-Group ID, TMGI), Geographical Zone ID, NEF ID, Location information (e.g. Geographical Zone ID, (R)AN Address), DNAI, application information (e.g. AF-Service-Identifier), Network Slice Information (e.g. S-NSSAI), NEF information.

In the above description, one network function (NF), such as AMF, can select another NF, such as SMF. In some implementation, the instances of NF can be grouped in as a NF set, such as AMF set as described in 3GPP TS 23.501. Other NF instances, such as SMF instances, can be also grouped in a set, such as SMF set. In some implementation, each NF set may have a representative network function (R-NF). The R-NF of a NF set may be the interface to another NF set. For example, the representative SMF (R-SMF) may communicate with R-AMF on behalf of individual SMF instance and AMF instance, respectively. For example, when an SMF instance wants to select an AMF instance, the SMF instance or R-SMF function may send a message to the NRF to discover an AMF set. The NRF may send a response message to the SMF instance with an indication of an AMF set, such as address of AMF set. The SMF instance or R-SMF may send a message to the AMF set address to request for MB session establishment, for example. The R-AMF of the AMF set may receive this message. The R-AMF may select an AMF instance and send the request received from the SMF instance to the selected AMF. The selected AMF instance may store the SMF instance address, and process the SMF request. The selected AMF instance may send a response to the SMF, which may carry the address of the AMF instance. The SMF instance will store the AMF instance address for further communications.

Similarly, instances of other NFs such as PCF, NEF, UDM, UDR may be grouped into set. Interactions between a NF instance of a NF set with another NF instance of another NF set may be similar to those steps described for the communication between an AMF instance of an AMF set and an SMF instance of an SMF set.

In case one NF instance is out of service, the R-NF may select another NF instance. For example, when an SMF instance sends a message to a previously connected AMF instance and this AMF instance was out of service, the R-AMF may receive the SMF message, and select a new AMF instance to handle the SMF's request. The new AMF instance may send a response message to the SMF, which include the address of the new AMF instance. The SMF will send messages to the new AMF instance in the future communication.

An aspect of the disclosure provides a method of Multicast/Broadcast (MB) delivery by a function, the method includes storing downlink (DL) MB Data associated with a MB session in a buffer of the function; transmitting, by the function, the DL MB Data to a plurality of receivers communicating with the function; receiving, by the function, a retransmission request from at least one of the receivers after the MB Data associated with a MB session has been transmitted; and retransmitting at least a part of the MB Data associated with a MB session data, by the function, according to the retransmission request. Optionally, the function is a RAN node or a UPF An aspect of this disclosure provides a method of multicast/broadcast (MB) delivery of downlink (DL) MB data to a plurality of electronic devices (EDs) connected to a (radio) access network (R)AN node. The method includes storing the DL MB data in a buffer of the (R)AN node; and transmitting, by the (R)AN node, the DL MB data to the plurality of EDs.

Another aspect of this disclosure provides an electronic device for use in a communication network, where the electronic device includes at least one processor; and a non-transitory computer readable storable medium including software instructions configured to control the at least one processor to perform steps of: receiving one or more physical layer packets of downlink (DL) multicast/broadcast (MB) data transmitted by a radio access network (R)AN node of the network; determine whether or not any physical layer packets of the DL MB data are missing from among the received one or more physical layer packets; and requesting the (R)AN node to retransmit any missing physical layer packets of the DL MB Data.

Another aspect of this disclosure provides an electronic device for use in a communication network, where the electronic device includes at least one processor; and a non-transitory computer readable storable medium including software instructions configured to control the at least one processor to: create a multicast/broadcast (MB) session context including information pertaining to a MB session; and store the MB session context in a storage medium accessible by the electronic device.

Another aspect of this disclosure provides an access node of a mobile communication network, where the access node includes at least one processor; and a non-transitory computer readable storable medium including software instructions configured to control the at least one processor to: store packets of downlink (DL) multicast/broadcast (MB) data received from an application server of the network; and subsequently transmitting the packets of DL MB data to a plurality of electronic devices (EDs) within a coverage area of the access node.

Another aspect of this disclosure provides a method of multicast/broadcast (MB) delivery of downlink (DL) MB data to a plurality of electronic devices (EDs) connected to a (radio) access network ((R)AN). The method includes receiving, by a user plane function (UPF) of the (R)AN, the DL MB data from an application server; identifying, by the UPF, one or more (R)AN nodes, each identified (R)AN node being connected to at least one of the plurality of EDs; and subsequently transmitting, by the UPF, the DL MB data to each identified (R)AN node.

Another aspect of this disclosure provides a method of multicast/broadcast (MB) delivery of downlink (DL) MB data to a plurality of electronic devices (EDs) connected to a (radio) access network ((R)AN). The method includes receiving, by a network exposure function (NEF) of the (R)AN, the DL MB data from either an application server (AS) or an application function (AF) associated with the AS; receiving a request from a user plane function (UPF) of the (R)AN; and at least partially in response to the request, transmitting, by the NEF, the DL MB data to the UPF.

Another aspect of the disclosure provides a method of multicast/broadcast (MB) session establishment. The method includes receiving, by a session management function (SMF), a request for a MB session establishment. The method further includes selecting, by the SMF, an access and mobility management function (AMF) according to the request. The method further includes sending, by the SMF, a notification indicating the MB session establishment to a plurality of electronic devices (EDs) via the selected AMF. The method further includes receiving, by the SMF, an acknowledgement from at least one of the selected AMF and at least one of the plurality of EDs. In some embodiments the method further includes sending a request for the MB session establishment to a user plane (UP) function (UPF), the request including parameters for use by the UPF for transmitting downlink (DL) MB data associated with the MB session. In some embodiments the request indicating to the UPF how to establish the MB session and/or transmit downlink (DL) MB data associated with the MB session to at least one radio access network (R)AN node. In some embodiments the method further includes requesting at least one (R)AN node to establish of the MB session. In some embodiments the method further includes receiving, by the SMF, a message indicating that a transmission of DL MB data associated with the MB session is complete. In some embodiments the method further includes indicating, by the SMF, to an application function which requested the MB session that the transmission of DL MB data associated with the MB session is complete.

Another aspect of the disclosure provides a method of multicast/broadcast (MB) session establishment. The method includes receiving, by an access and mobility management function (AMF), a request for a MB session establishment from a network exposure function (NEF). The method further includes sending, by the AMF, a request to a network repository function (NRF) to provide session management function (SMF) information for SMF selection. The method further includes requesting, by the AMF, a MB session establishment to a selected SMF. In some embodiments, the SMF information for SMF selection includes at least one of internal electronic device (ED) group identifier (ID), application function (AF) information, geographical zone identifier (ID), and radio access network (R)AN address(es). In some embodiments the request being a control signalling.

Another aspect of the disclosure provides a method of multicast/broadcast (MB) delivery. The method includes receiving, by a network exposure function (NEF), a request for a MB session establishment from an application function. The method further includes notifying a session management function (SMF), by the NEF, of the request for the MB session establishment. The method further includes receiving and buffering downlink MB data of a MB session. The method further includes receiving information, by the NEF, associated with a user plane (UP) function (UPF) which is responsible for transmitting the downlink MB data of the MB session. The method further includes transmitting the downlink MB data to a RAN node via the UPF. In some embodiments the method further includes selecting, by the NEF, the SMF. In some embodiments the method the request being received via control signalling. In some embodiments from downlink MB data is received from the application function or other device (e.g., another device associated with the application function or server).

Another aspect of the disclosure provides a method of multicast/broadcast (MB) delivery. The method includes storing downlink (DL) MB data associated with a MB session in a buffer of a radio access network (R)AN node. The method further includes transmitting, by the (R)AN node, the DL MB data to a plurality of electronic devices (EDs) connected to the (R)AN node. The method further includes receiving, by the (R)AN node, a retransmission request from at least one of the plurality of EDs after the MB data associated with the MB session has been transmitted. The method further includes retransmitting at least a part of the MB data associated with the MB session, by the (R)AN node, according to the retransmission request. In some embodiments the retransmission request is a unicast retransmission request. In some embodiments the part of the MB data associated with a MB session data is retransmitted to one of following: the at least one of the EDs that sent the retransmission request, and the plurality of EDs that the DL MB data associated with a MB session has been sent to. In some embodiments the further includes receiving a size of the buffer to store the DL MB data associated with a MB session from a session management function (SMF). In some embodiments the method further includes receiving a notification from a user plane (UP) function (UPF), the notification indicating that all the DL MB data associated with a MB session has been transmitted. In some embodiments the method further includes sending a message to the plurality of EDs, the message indicating the MB data associated with a MB session has been transmitted. In some embodiments the method further includes sending, by the (R)AN node, a message indicating that a transmission of the DL MB data associated with the MB session is complete, to a session management function.

Another aspect of the disclosure provides a method of multicast/broadcast (MB) delivery. The method includes receiving, by an electronic device (ED), downlink (DL) multicast/broadcast (MB) data associated with a MB session from a radio access network (R)AN node of the network. The method further includes: if a part of the DL MB data is missing, requesting the (R)AN node to retransmit the missing part of the DL MB data. The method further includes receiving, by the ED, a retransmission of the part of the DL MB data from the (R)AN node. In some embodiments the method, before the requesting, further includes receiving a message indicating the MB data associated with the MB session has been transmitted.

Another aspect of the disclosure provides a method of multicast/broadcast (MB) session establishment. The method includes receiving, by an access and mobility management function (AMF), a N11 message indicating information associated with a MB session from a session management function (SMF). The method further includes transmitting, by the AMF, a plurality of N2 messages to a plurality of radio access network (R)AN nodes, each of the plurality of N2 messages corresponding to at least one of the plurality of radio access network (R)AN nodes, the N2 message including partial information indicated by the N11 message.

Another aspect of the disclosure provides a method of multicast/broadcast (MB) session announcement. The method includes receiving, by an access and mobility management function (AMF), a N11 message indicating information associated with a MB session from a session management function (SMF). The method further includes transmitting, by the AMF, a plurality of N1 messages to a plurality of electronic devices (EDs), each of the plurality of N1 messages corresponding to at least one of the plurality of EDs, the N1 message including partial information indicated by the N11 message.

Another aspect of the disclosure provides a session management function (SMF) including at least one processor and a non-transitory computer readable storable medium. The non-transitory computer readable storable medium including software instructions configured to control the at least one processor to perform steps of: receiving a request for a MB session establishment; selecting an access and mobility management function (AMF) according to the request; sending a notification indicating the MB session establishment to a plurality of electronic devices (EDs) via the selected AMF; and receiving an acknowledgement from at least one of the selected AMF and at least one of the plurality of EDs. In some embodiments the software instructions are configured to control the at least one processor to further perform the step of sending a request for the MB session establishment to a user plane (UP) function (UPF), the request including parameters for use by the UPF for transmitting downlink (DL) MB data associated with the MB session. In some embodiments the software instructions are configured to control the at least one processor to further perform the step of requesting at least one (R)AN node to establish of the MB session. In some embodiments the software instructions are configured to control the at least one processor to further perform the steps of receiving, by the SMF, a message indicating that a transmission of DL MB data associated with the MB session is complete; and indicating, by the SMF, to an application function which requested the MB session that the transmission of DL MB data associated with the MB session is complete. In some embodiments the request indicating the UPF how to establish the MB session and/or transmit downlink (DL) MB data associated with the MB session to at least one radio access network (R)AN node Another aspect of the disclosure provides an access and mobility management function (AMF) including at least one processor and a non-transitory computer readable storable medium. The non-transitory computer readable storable medium including software instructions configured to control the at least one processor to perform steps of: receiving a request for a MB session establishment from a network exposure function (NEF); sending a request to a network repository function (NRF) to provide session management function (SMF) information for SMF selection; and requesting a MB session establishment to a selected SMF. In some embodiments the SMF information for SMF selection includes at least one of internal electronic device (ED) group identifier (ID), application function (AF) information, geographical zone identifier (ID), and radio access network (R)AN address(es).

Another aspect of the disclosure provides a network exposure function (NEF) including at least one processor and a non-transitory computer readable storable medium. The non-transitory computer readable storable medium including software instructions configured to control the at least one processor to perform steps of: receiving a request for a MB session establishment from an application function; notifying a session management function (SMF) of the request for the MB session establishment; receiving and buffering downlink MB data of a MB session; receiving information associated with a user plane (UP) function (UPF) which is responsible for transmitting the downlink MB data of the MB session; and transmitting the downlink MB data to a RAN node via the UPF. In some embodiments the downlink MB data is received from at least one of the application function and another device associated with the application function. In some embodiments the software instructions are configured to control the at least one processor to further perform the step of selecting the SMF. In some embodiments NEF further includes at least one network interface for communicating with other control plane functions, and the request is received by the at least one network interface. In some embodiments the request being a control signaling.

Another aspect of the disclosure provides a radio access network (R)AN node including at least one processor and a non-transitory computer readable storable medium. The non-transitory computer readable storable medium including software instructions configured to control the at least one processor to perform steps of: storing downlink (DL) MB data associated with a MB session in the at least one buffer; transmitting the DL MB data to a plurality of electronic devices (EDs) connected to the (R)AN node; receiving a retransmission request from at least one of the plurality of EDs after the MB data associated with the MB session has been transmitted; and retransmitting at least a part of the MB data associated with the MB session according to the retransmission request. In some embodiments the retransmission request is a unicast retransmission request. In some embodiments the part of the MB data associated with a MB session data is retransmitted to one of following: the at least one of the EDs that sent the retransmission request, and the plurality of EDs that the DL MB data associated with a MB session has been sent to. In some embodiments the software instructions are configured to control the at least one processor to further perform the steps of receiving a size of the buffer to store the DL MB data associated with a MB session from a session management function (SMF).

In some embodiments the software instructions are configured to control the at least one processor to further perform the steps of receiving a notification from a user plane (UP) function (UPF), the notification indicating that all the DL MB data associated with a MB session has been transmitted. In some embodiments the software instructions are configured to control the at least one processor to further perform the steps of sending a message to the plurality of EDs, the message indicating the MB data associated with a MB session has been transmitted. In some embodiments the software instructions are configured to control the at least one processor to further perform the steps of sending, a message indicating that a transmission of the DL MB data associated with the MB session is complete, to a session management function.

Another aspect of the disclosure provides an electronic device including at least one processor and a non-transitory computer readable storable medium. The non-transitory computer readable storable medium including software instructions configured to control the at least one processor to perform steps of: receiving downlink (DL) multicast/broadcast (MB) data associated with a MB session from a radio access network (R)AN node of the network; if a part of the DL MB data is missing, requesting the (R)AN node to retransmit the missing part of the DL MB data; and receiving a retransmission of the part of the DL MB data from the (R)AN node. In some embodiments the software instructions are configured to control the at least one processor to further perform the steps of: before the requesting, receiving a message indicating the MB data associated with the MB session has been transmitted.

Another aspect of the disclosure provides an access and mobility management function (AMF) including at least one processor and a non-transitory computer readable storable medium. The non-transitory computer readable storable medium including software instructions configured to control the at least one processor to perform steps of: receiving, by an access and mobility management function (AMF), a N11 message indicating information associated with a MB session from a session management function (SMF); and transmitting, by the AMF, a plurality of N2 messages to a plurality of radio access network (R)AN nodes, each of the plurality of N2 messages corresponding to at least one of the plurality of radio access network (R)AN nodes, the N2 message including partial information indicated by the N11 message.

Another aspect of the disclosure provides an access and mobility management function (AMF) including at least one processor and a non-transitory computer readable storable medium. The non-transitory computer readable storable medium including software instructions configured to control the at least one processor to perform steps of: receiving, by an access and mobility management function (AMF), a N11 message indicating information associated with a MB session from a session management function (SMF); and transmitting, by the AMF, a plurality of N1 messages to a plurality of electronic devices (EDs), each of the plurality of N1 messages corresponding to at least one of the plurality of EDs, the N1 message including partial information indicated by the N11 message.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of establishing a multicast or broadcast (MB) session, the method comprising: receiving, by a network exposure function (NEF) from an application function (AF), a request for MB session establishment; selecting, by the NEF, a session management function (SMF) from a plurality of SMFs for serving the MB session; sending, by the NEF to the SMF, a message indicating information about the MB session; in response to the message, sending, by the SMF to the NEF, an acknowledgment message indicating one or more user plane functions (UPFs) determined for receiving MB data; and sending, by the NEF to the AF, an MB session response after receiving the acknowledgement.

2. The method of claim 1, wherein the request for MB session establishment comprises one or more of: information to identify an electronic device (ED) group, information to identify EDs, session start time, session duration, session end time, quality of service (QoS) requirements, reliability requirement, and address information of an application server (AS).

3. The method of claim 2, wherein the information to identify an ED group comprises an external group ID.

4. The method of claim 2, wherein the information to identify EDs comprises one or more of: generic public subscription identifier (ID), subscriber permanent IDs, mobile subscriber integrated services digital network numbers, and external IDs.

5. The method of claim 2, wherein the address information of an AS comprises one or more of: an internet protocol (IP) address, an IP prefix, and a port number.

6. The method of claim 2, wherein the request further comprises location information of the MB session including one or more of geographical location, geographical zone ID.

7. The method of claim 1, wherein the NEF selects the SMF based on an external group ID included in the request for MB session establishment.

8. The method of claim 1, wherein the selecting, by the NEF, a session management function (SMF) from a plurality of SMFs for serving the MB session comprises:
sending, by the NEF to a network repository function (NRF), a request for information about the SMF;
receiving, by the NEF from the NRF, information about the SMF including an address.

9. The method of claim of 1, wherein the NEF selects the SMF based on locally stored information about the SMF.

10. The method of claim 1, wherein the acknowledgment message comprises one or more of: an address of the one or more UPFs and a port number, wherein the address includes one or more of an interpret protocol (IP) address and an IP prefix.

11. The method of claim 1, wherein the MB session response comprises one or more of: an address of the one or more UPF and a port number to be used for receiving MB data of MB session, wherein the address includes one or more of an interpret protocol (IP) address and an IP prefix.

12. A method of establishing a multicast broadcast (MB) session, the method comprising receiving, by a session management function (SMF) from a network exposure function (NEF), a message indicating information about the MB session;
sending, by the SMF to a policy control function (PCF), a policy request message comprising an MB session identifier (ID) associated with the MB session; after receiving the policy request message, sending, by the PCF to the SMF, policy and charging control (PCC) rules associated with the MB session; and sending, by the SMF to one or more user plane functions (UPFs), a request message including information for use to receive MB data.

13. The method of claim 12, wherein the policy request message further comprises a temporary mobile group ID.

14. The method of claim 12, wherein the information for use to receive MB data comprises one or more of: an internet protocol (IP) address of the one or more UPF, an IP prefix of the one or more UPF, and a port number.

15. The method of claim 12, wherein, the one or more UPFs are determined based on one or more of:
   a connection topology of the one or more UPFs; and
   an address of the NEF.

16. The method of claim 12 further comprising:
   receiving, by the SMF from the one or more UPFs, a response message indicating confirmation of resource allocation for the MB session; and
   sending, by the SMF to the NEF, an acknowledgment message including one or more of: an address of the one or more UPF and a port number.

17. The method of claim 12, wherein the policy request message further comprises one or more of: a temporary mobile group ID, an identifier of an application function (AF) that requested the MB session.

18. A system of establishing a multicast broadcast (MB) session, the system comprising a network exposure function (NEF) and a session management function (SMF), wherein: the NEF is configured for: receiving, from an application function (AF), a request for MB session establishment; selecting, the SMF, from a plurality of SMFs for serving the MB session; sending, to the SMF, a message indicating information about the MB session; receiving, from the SMF, an acknowledgment message indicating one or more user plane functions (UPFs) determined for receiving MB data; and sending, to the AF, an MB session response; the SMF is configured for: receiving, from the NEF, the message indicating information about the MB session; sending, to a policy control function (PCF), a policy request message comprising an MB session identifier (ID) associated with the MB session; receiving, from the PCF, policy and charging control (PCC) rules associated with the MB session; sending, to the one or more UPFs, a request message including information for use to receive MB data, the one or more UPFs determined, in part, based on connection topology of the one or more UPFs.

19. The system of claim 18, wherein the request for MB session establishment comprises one or more of: information to identify an electronic device (ED) group, information to identify EDs, session start time, session duration, session end time, quality of service (QoS) requirements, reliability requirement, and address information of an application server (AS).

20. The system of claim 18, wherein the SMF is further configured for:
   receiving, from the one or more UPFs, a response message indicating confirmation of resource allocation for the MB session; and
   sending, to the NEF, the acknowledgment message.

* * * * *

UNITED STATES PATENT AND TRADEMARK OFFICE
CERTIFICATE OF CORRECTION

PATENT NO. : 11,483,680 B2
APPLICATION NO. : 17/176727
DATED : October 25, 2022
INVENTOR(S) : Ngoc Dung Dao and Xu Li It is certified that error appears in the above-identified patent and that said Letters Patent is hereby corrected as shown below:

In the Specification

Column 13, Line 35:
"TED" should read --TEID--

Column 20, Line 15:
"TED" should read --TEID--

Column 20, Line 61:
"TED" should read --TEID--

Column 25, Line 64:
"(TED)" should read --(TEID)--

Column 25, Line 64:
"DL TED" should read --DL TEID--

Column 27, Line 14:
"DL TED" should read --DL TEID--

Column 27, Line 64:
"DL TED" should read --DL TEID--

Column 30, Line 8:
"UL TED" should read --UL TEID--

Column 31, Line 43:
"(TED)" should read --(TEID)--

Signed and Sealed this
Third Day of September, 2024

Katherine Kelly Vidal
*Director of the United States Patent and Trademark Office*

CERTIFICATE OF CORRECTION (continued)
U.S. Pat. No. 11,483,680 B2

Column 32, Line 58:
"TED" should read --TEID--

Column 33, Line 54:
"TED" should read --TEID--